United States Patent [19]

Fukushima

[11] Patent Number: 5,058,184
[45] Date of Patent: Oct. 15, 1991

[54] HIERACHICAL INFORMATION PROCESSING SYSTEM

[75] Inventor: Kunihiko Fukushima, Tokyo, Japan
[73] Assignee: Nippon Hoso Kyokai, Japan
[21] Appl. No.: 299,539
[22] Filed: Jan. 23, 1989

Related U.S. Application Data

[63] Continuation-in-part of Ser. No. 75,840, Jun. 26, 1987, abandoned.

[30] Foreign Application Priority Data

Nov. 2, 1985 [JP] Japan .................. 60-245298

[51] Int. Cl.$^5$ ............................. G06K 9/58
[52] U.S. Cl. ..................... 382/37; 382/14; 364/513
[58] Field of Search .......... 382/14, 15, 27, 35, 382/36, 37, 38, 39, 49; 364/513

[56] References Cited

U.S. PATENT DOCUMENTS

| | | | |
|---|---|---|---|
| 3,560,927 | 2/1971 | Rabinow et al. | 382/25 |
| 3,950,733 | 4/1976 | Cooper et al. | 382/25 |
| 4,003,022 | 1/1977 | Takahashi et al. | 382/37 |
| 4,075,605 | 2/1978 | Hilley et al. | 382/48 |
| 4,453,268 | 6/1984 | Britt | 382/67 |
| 4,660,166 | 4/1987 | Hopfield | 364/807 |
| 4,805,225 | 2/1989 | Clark | 364/513 |
| 4,858,147 | 8/1989 | Conwell | 364/513 |
| 4,876,731 | 10/1989 | Loris et al. | 382/36 |
| 4,881,178 | 11/1989 | Holland et al. | 364/513 |
| 4,914,708 | 4/1990 | Carpenter et al. | 382/14 |

FOREIGN PATENT DOCUMENTS

| | | |
|---|---|---|
| 51-35255 | 3/1976 | Japan . |
| 52-127132 | 10/1977 | Japan . |
| 55-124878 | 9/1980 | Japan . |
| 55-124879 | 9/1980 | Japan . |
| 58-53790 | 12/1983 | Japan . |
| 59-163679 | 9/1984 | Japan . |
| 60-712 | 1/1985 | Japan . |
| 62-106590 | 3/1987 | Japan . |
| 53-110334 | 9/1988 | Japan . |

OTHER PUBLICATIONS

Biol. Cybern., vol. 55, No.1, Oct. 1986, pp. 5–15, Springer ∝ Verlag; K. Fukushima: "A Neural Network Model for Selective Attention in Visual Pattern Recognition".
Denshi, Tsushin Gakkai Robunshi, vol. 69D, No. 6, Jun. 1986, pp. 993–1003: K. Fukushima: "A Neural Network Model for the Mechanism of Selective Attention in Visual Pattern Recognition".
IEEE Transactions on Systems, Man, and Cybernetics, vol. SMC-13, No. 5, (1983) K. Fukushima et al.
IEEE Transactions on Systems, Man, and Cybernetics, vol. SMC-13, No. 5, (1983) Y. Harai.
Fukushima et al., "Neocognitron: A New Algorithm for Pattern Recognition Tolerant of Deformation and Shifts in Position", Pattern Recognition, vol. 15, No. 6, pp. 455–469, 1982.
Fukishima, "Cognitron: A Self-Organizing Multilayered Neural Network Model", NHK Technical Monograph, No. 30, Jan. 1981.
Fukushima et al., "A Self-Organizing Neural Network with a Function of Associative Memory: Feedback--Type Cognitron", Biological Cybernetics, No. 28, pp. 201–208, 1978.
Fukushima, "Neural Network for Selective Attention in Visual Pattern Recognition and Associative Recall", Applied Optics, vol. 26, No. 23, pp. 4985–4992, Dec. 1987.

Primary Examiner—David K. Moore
Assistant Examiner—Jose L. Couso
Attorney, Agent, or Firm—Parkhurst Wendel & Rossi

[57] ABSTRACT

Plural efferent signal paths paired with plural conventional afferent signal paths respectively are provided between lower order cell-layers and higher order cell-layers of a neural network model. Once an output response has been derived from the higher order cell-layer, an efferent signal is transmitted through the efferent signal path paired with the afferent signal path concerned in the output response. Under the control of which efferent signal, the afferent signal path contributing to the output response of the higher order cell-layer is affected by an excitatory effect, while the afferent signal path not contributing to the same is affected by an inhibitory effect. Hence the information processing consisting of both the associative memory and the pattern recognition provided with the faculty of segmentation can be attained despite deformation and positional error of the input pattern.

8 Claims, 11 Drawing Sheets

FIG_3
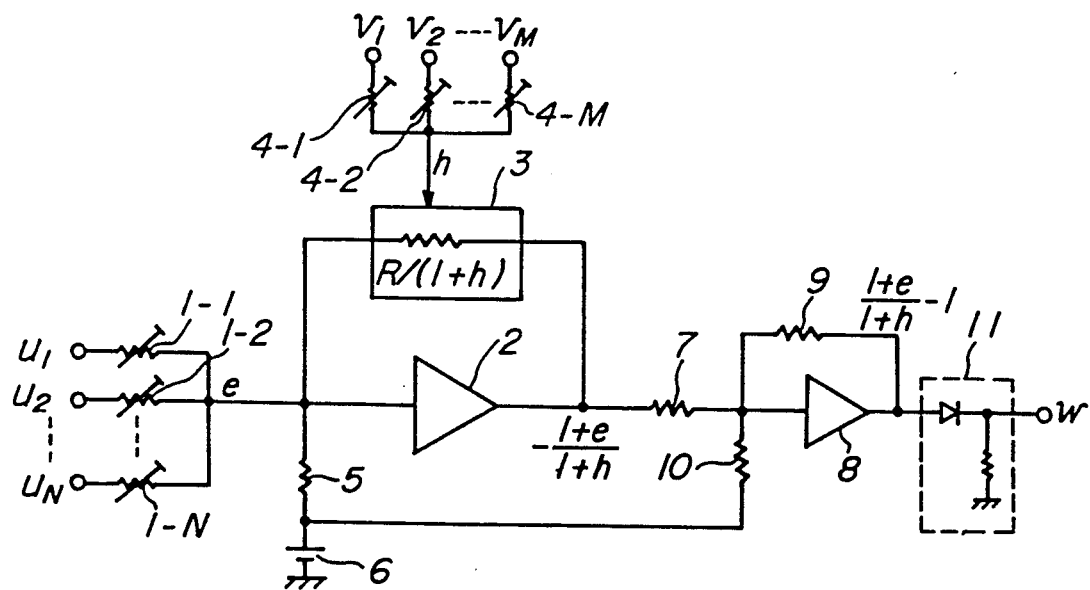
FIG_4
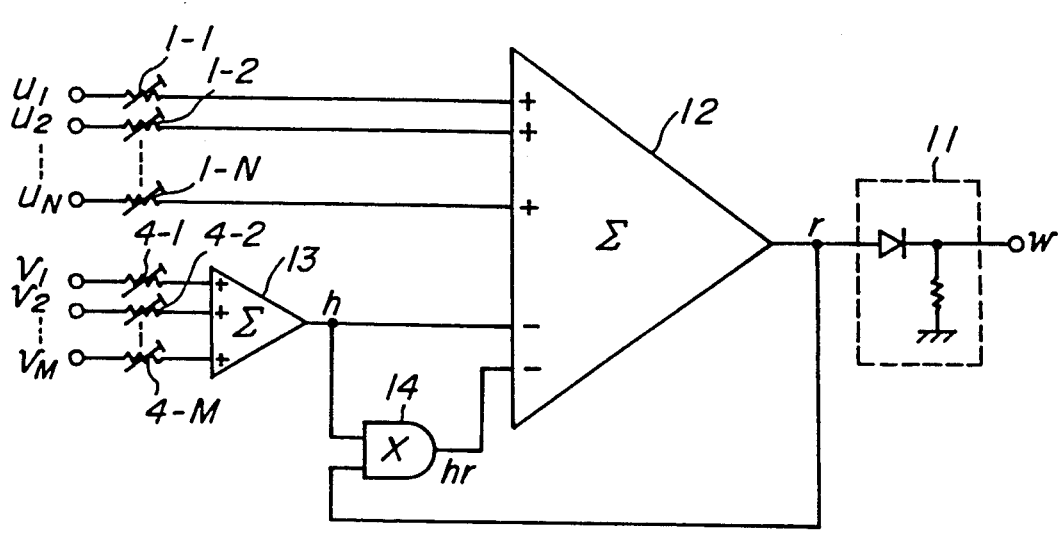

FIG_5
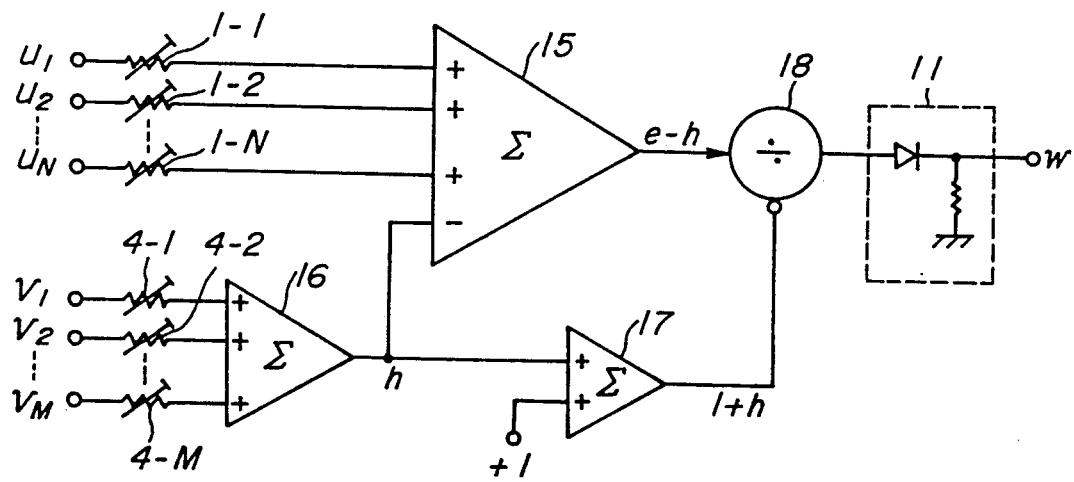
FIG_6
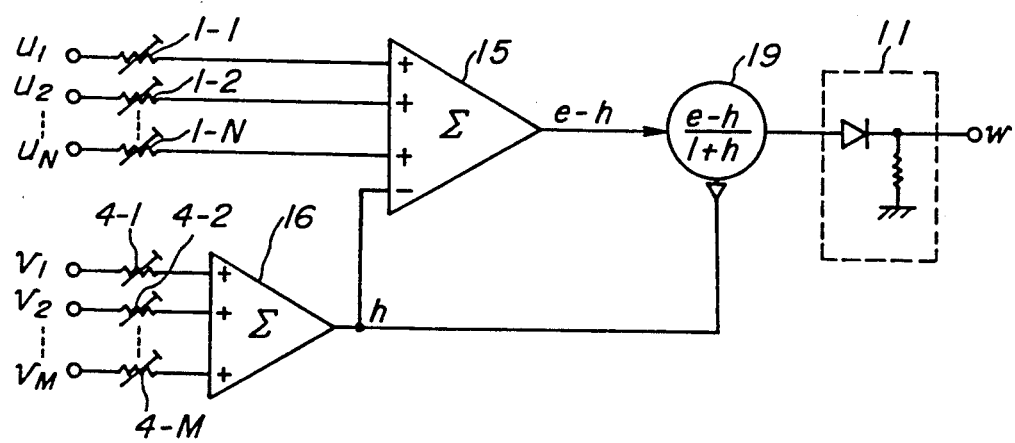

FIG_8
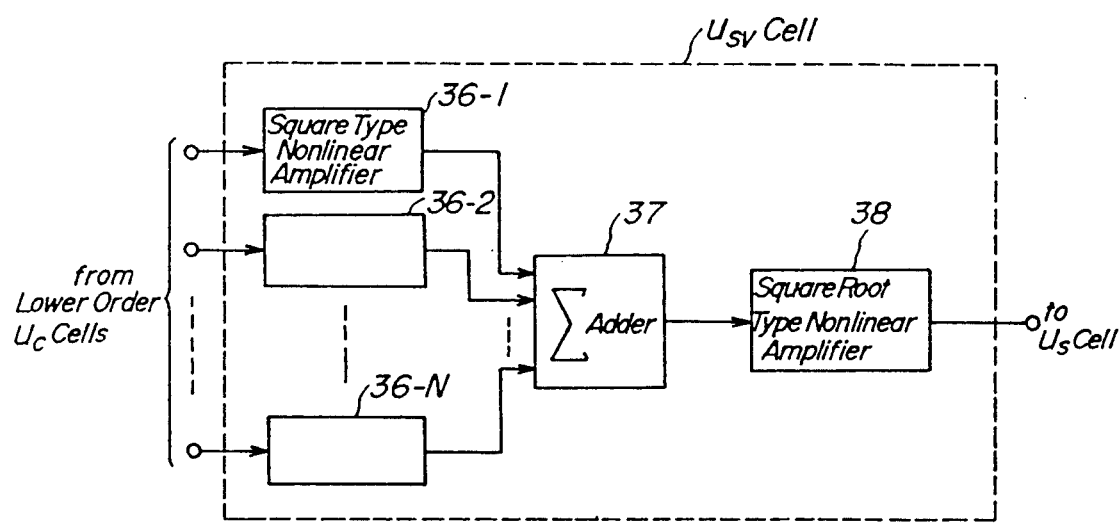
FIG_9
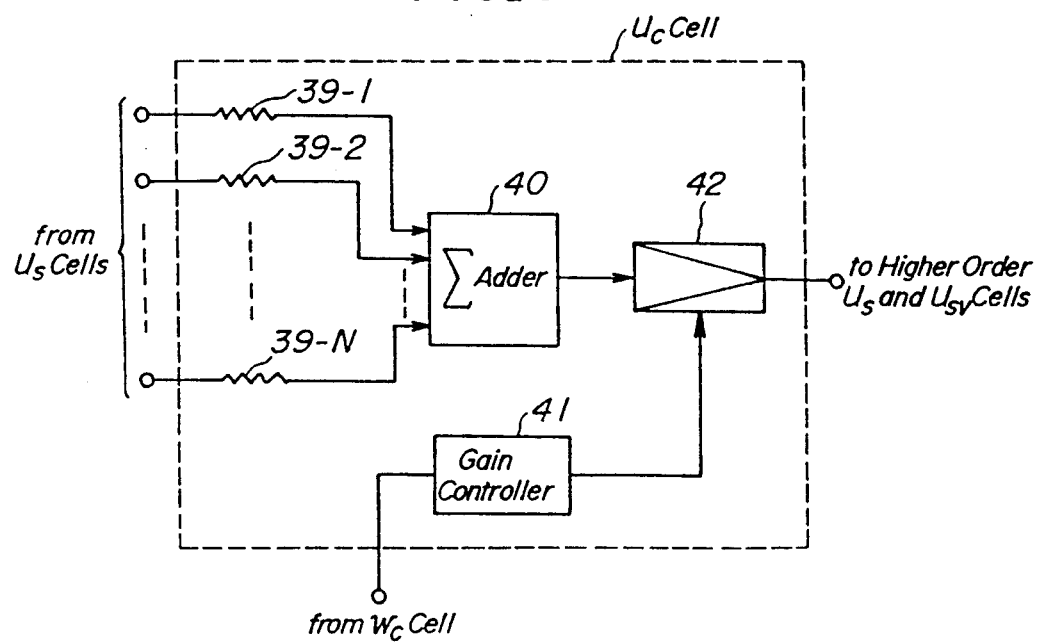

FIG_10
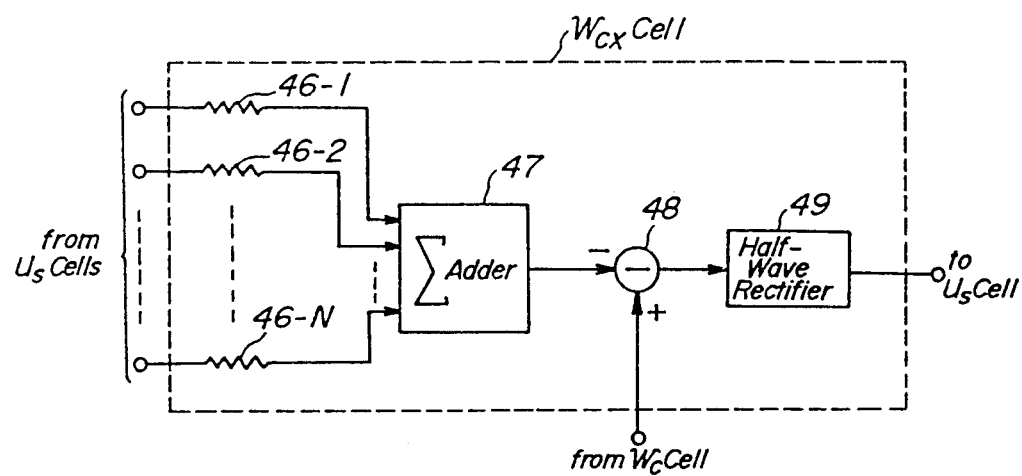
FIG_12
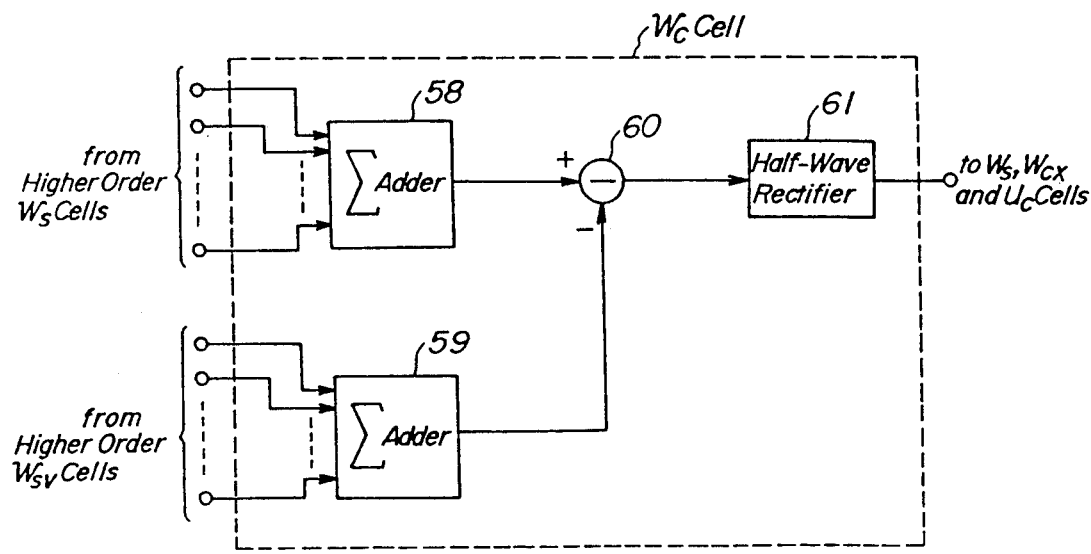

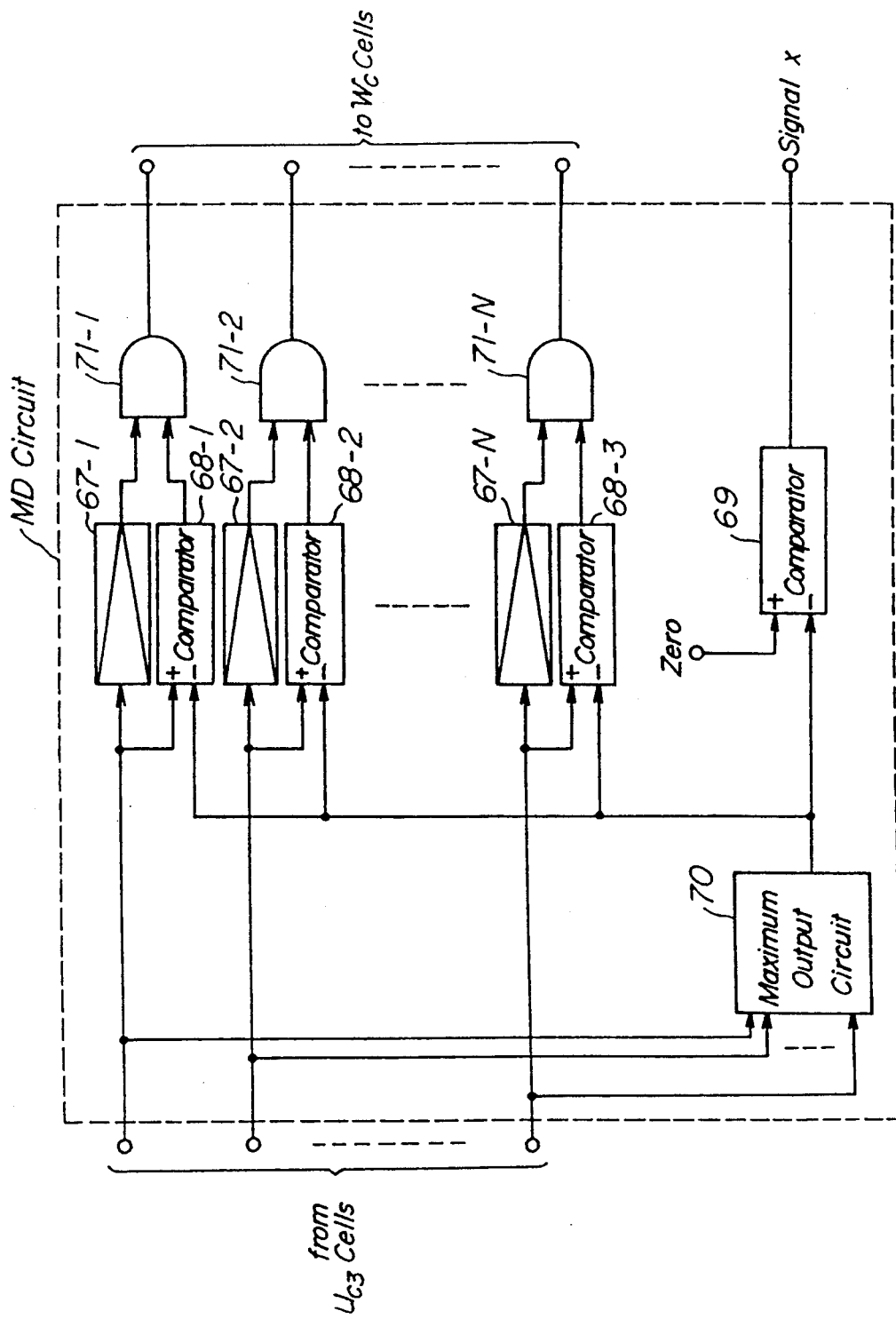
FIG._14

FIG_15

FIG_16

FIG_17

FIG_18

HIERACHICAL INFORMATION PROCESSING SYSTEM

The present application is a continuation-in-part application of U.S. patent application Ser. No. 07/075,840 filed on June 26, 1987 and now abandoned.

TECHNICAL FIELD

The present invention relates to a hierarchical information processing system for processing information in a cascade of successively arranged plural information processing layers in each of which plural nonlinear elements are two-dimensionally arranged, particularly, provided with an autoassociative recall type high grade associative memory function by which a pattern consisting of characters and figures excessively distorted in shape or excessively shifted in position, or accompanied with expansion or reduction can be readily and accurately recognized, and noise contained therein can be removed or defected portions thereof can be interpolated.

TECHNICAL BACKGROUND

When we watch a composite figure consisting of two patterns or more, we can segment it into individual patterns, and recognize each pattern separately. Even if one of the patterns to which we are paying attention is affected by noise or defects, we can recall the complete pattern from which the noise has been eliminated and the defects restored. It is not necessary for perfect recall that the stimulus pattern is identical in shape to the pattern which we learned. Even though the pattern is distorted in shape or changed in size, we can recognize it and restore defects by interpolation. During the process of interpolation, we make full use of even slight traces in the defective parts of the pattern to which we are selectively paying attention, and recall the perfect original pattern. A hierarchical neural network model which performs this function of the human brain is proposed in the prior art.

As for a network required for recalling or recognizing a complete pattern on the basis of an incomplete pattern, various kinds of autoassociative recall type associative memory networks have been conventionally proposed. However, most of these conventional associative memory networks do not work well unless the stimulus pattern is identical in size, shape and even position to a training pattern. That is, it could be satisfactorily operated only when an input pattern did not only consist of a previously learned training pattern, but also the former completely coincided with the latter in size, shape and position. Although an associative memory system such as those employing an autocorrelation function accepting only the shift in position of the input pattern has been conventionally proposed, this conventional system also was completely impotent with regard to changes in size and distortion in shape of the pattern.

The present applicant has already disclosed a pattern recognition system called "neocognitron" in the specifications of Japanese Patent No. 1221756 (Japanese Patent Application Publication No. 58(1983)-53790) "A pattern recognition system" and Japanese Patent No. 1279063 (Japanese Patent Application Publication No. 60(1985)-712) "A pattern recognition equipment", which system is provided with an ability for correctly recognizing a pattern despite the effects mentioned above, that is, shifts in position, distortion in shape, and change in size and the like of the input pattern.

However, these disclosed systems and equipment relate to no more than pattern recognition restricted within the above-mentioned version, and hence have not yet been provided with the ability to derive information regarding a phenomenon from incomplete or ambiguous informations with regard thereto by autoassociative recall, that is, the associative memory function required for attaining further higher grade pattern recognition.

On the other hand, the present applicant has also disclosed, as a system provided with the aforesaid associative memory function, a hierarchical information processing network in Japanese Patent Application Laid-open Publication No. 59-163679 "A hierarchical information processing network", which network is provided with the ability to successively select similar patterns resembling a previously learned training pattern in turn from plural input patterns, or, to recall a complete pattern from an incomplete input pattern or an input pattern obscured by noise. However, this hierarchical information processing network has not yet been provided with the aforesaid ability for processing shifts in position and deformations in shape of the input pattern, similarly as the conventional associative memory systems which have been proposed.

DISCLOSURE OF THE INVENTION

An object of the present invention is to obviate the above-mentioned various shortcomings, and to provide a novel hierarchical information processing system in which the above-disclosed hierarchical information processing network is offered with an ability such that pattern recognition can be achieved despite the affect of considerable defects such as deformation in shape, change in size and shift in position of the input pattern, as is different from the aforesaid "neocognitron", but with a higher grade autoassociative recall type associative memory function and further with a segmentation faculty.

Accordingly, in the hierarchical information processing system of the present invention, for achieving the information processing mainly through the aforesaid hierarchical information processing network:

both of afferent signal paths extended upwards from lower order stages on the pattern input side to higher order stages on the recognition output side and efferent signal paths extended downwards from higher order stages to lower order stages on the contrary are provided;

input information supplied to the lower order stages is successively transmitted to the higher order stages through the afferent signal paths, as being successively processed in each of plural cell-layers of successive order stages, meanwhile, in the direction opposite thereto, an output derived from the higher order stages is fed-back to the lower order stages through the efferent signal paths;

once an output response has been derived from the higher order stages, according to the action of the efferent signal transmitted from the higher order stages to the lower order stages, the afferent signal paths contribute to cause the output response in the higher order stages and the information processing processes belonging thereto are affected by an excitatory effect, meanwhile the remaining efferent signal paths and the information processing processes belonging thereto are affected by an inhibitory effect;

the ability of the pattern segmentation, that is, the distinction of components of a specified pattern from the remainder is offered by selectively extracting only the informations relevant to the specified pattern from plural patterns supplied to the lower order stages on the input side; or a complete pattern can be associatively recalled from an incomplete pattern by removing noise contained therein or by interpolating missing portions thereof.

In other words, the hierarchical information processing system according to the present invention is featured in that, for successively processing over a plurality of cell-layers each inter-layers of which a plurality of afferent signal paths for transmitting information signals are provided respectively, a plurality of efferent signal paths extended from higher order cell-layers to lower order cell-layers are respectively provided each inter-layers of the plurality of cell-layers, so as to make pairs respectively with the plurality of afferent signal paths extended from lower order cell-layers to higher order cell-layers, once an output response has been derived from the higher order cell-layer belonging to the afferent signal path, an efferent signal being transmitted through the efferent signal path making the pair with the specified afferent signal path transmitting an afferent signal which corresponds to the input response, the transmission of the information signal through each of the plurality of afferent signal paths being controlled respectively in response to the efferent signal, and hence, as to the causation of the input response derived from the higher order cell-layer under the control in response to the efferent signal, contributive one of the plurality of afferent signal paths being affected by an excitatory effect, while not-contributive one thereof being affected by an inhibitory effect.

BRIEF DESCRIPTION OF THE DRAWINGS

FIGS. 3 to 6 are block diagrams showing various kinds of embodiments of Weber-Fechner type circuit arrangement respectively;

FIGS. 7 to 14 are block diagrams showing various kinds of embodiments of constituent cells of the neural circuit model as shown in FIG. 1;

FIG. 15 shows five training patterns used for the self-organization of the network;

FIG. 16 shows an example of the response of the network to juxtaposed patterns;

FIG. 17 shows an example of the response of the network to an incomplete distorted pattern; and FIG. 18 shows an example of the response of the network to superposed patterns.

Figure 1:
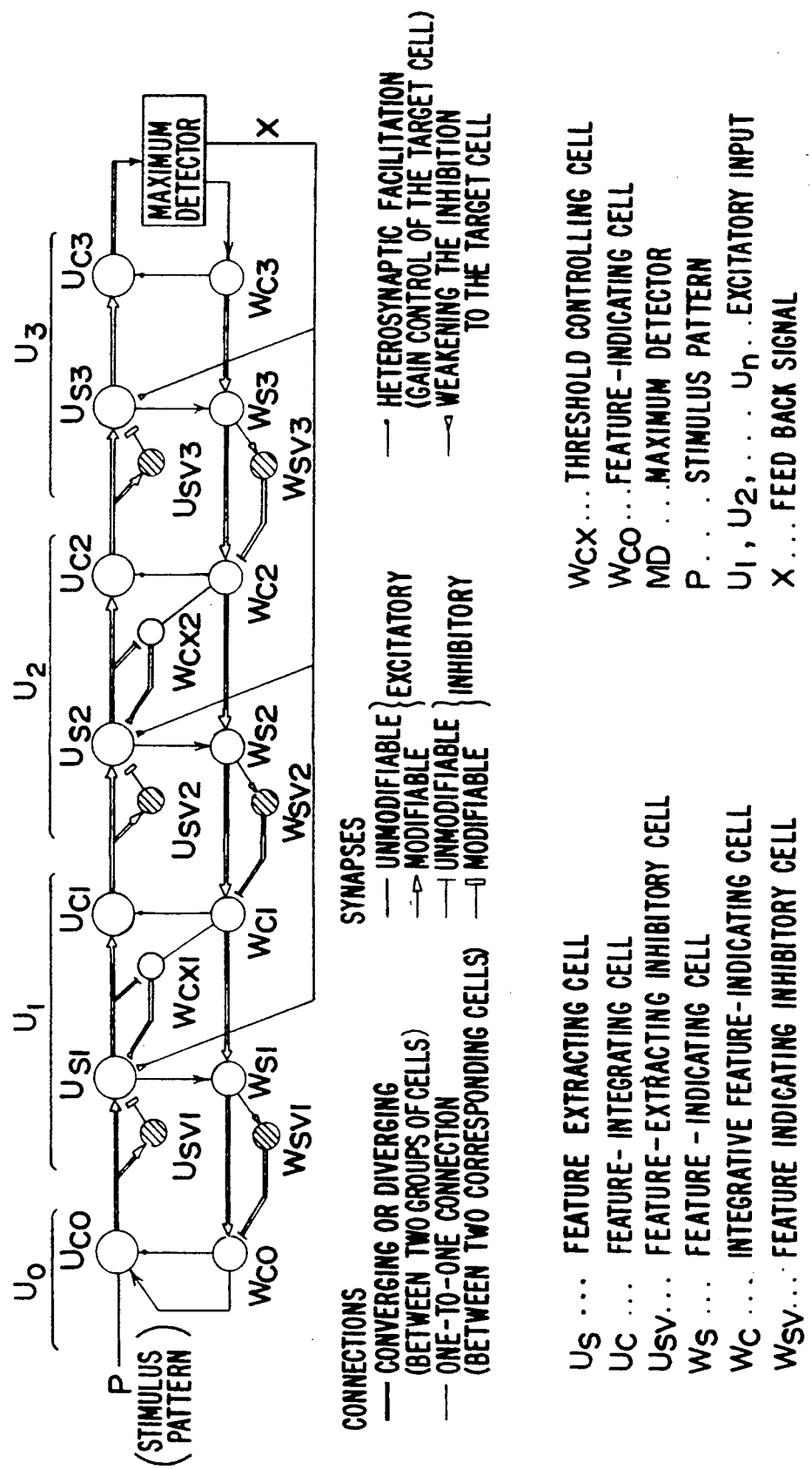
FIG. 1 is a block diagram showing an example of hierarchical structure of a neural network model employed for a hierarchical information processing network of the system according to the present invention.

1, 4 . . . gain-controlling adjustable resistor
2, 8 . . . operational amplifier
3 . . . voltage-control type adjustable resistor
5, 7, 9, 10 . . . resistor
6 . . . standard voltage source
11 . . . half-wave rectifier
14 . . . multiplying element
12, 13, 15, 16, 17 . . . linear summation element
18 . . . dividing element
19 . . . shunt type performance element
21, 23, 54, 55 . . . adjustable gain element
22, 37, 40, 47, 52, 58, 59 . . . total sum adder
24, 30, 42 . . . adjustable gain amplifier
25, 48, 60 . . . subtractor
26 . . . shunt type divider
27 . . . learning algorism
28, 41, 66 . . . gain controller
29 . . . adder
31, 49, 61 . . . half-wave rectifier
36 . . . square type nonlinear amplifier
38 . . . square root type nonlinear amplifier
39, 46, 51 . . . fixed gain amplifier
53 . . . minimum output circuit
64, 70 . . . maximum output circuit
56, 57, 63 . . . buffer amplifier
62 . . . phototransistor
67 . . . saturation amplifier
68, 69 . . . comparator
71 . . . AND gate.

BEST MODE FOR CARRYING OUT THE PRESENT INVENTION

Generally speaking, when a composite pattern consisting of a combination of more than two patterns is presented, a human being is able of observing one of these patterns at a time with attention in order and as a result, to individually recognize what is each of these patterns, as well as to effect the aforesaid pattern segmentation. Besides, at the same time, even when the pattern observed with attention is deteriorated by defects or noise, a human being is able to associate a complete pattern by interpolating those defects or by removing the noise. In this connection, it is not required that the presented pattern completely coincides with the previously learned training pattern in shape or in size. A human being is provided with an ability for completing the original, even when the shape thereof is somewhat distorted or the size thereof is changed, by directly interpolating defects of the distorted pattern or by directly removing noise therefrom, and further by effectively utilizing a slight trace remaining in the defective portion of the attended pattern. The information processing system of the present invention has been proposed on the basis of the neural network model provided for realizing this ability of a human being.

A preferred embodiment of the present invention will be described in detail hereinafter by referring to the accompanying drawings.

An embodiment based on a multilayered network consisting of network elements arranged in layer state will be described hereinafter. However, as for the concrete realization, it is enough to carry out the same algorithm, so that it is not necessary at all to restrict the embodiment to be described within the structure of the above multilayered network.

In general, the neural network model used for the pattern recognition equipment is composed of a combination of plural cell-layers in which plural cells are arranged in multilayer state, and hence the hierarchical structure as shown in a block diagram of FIG. 1 is exemplified as of four layers. In this block diagram, a circular mark o indicates a cell. Although each of the cell layers actually contains plural cells, plural cells of each kind are represented by only one cell in FIG. 1. Connections as indicated by single or double lines in FIG. 1 exist between these cells, the single line showing the existence of one-to-one connection between heterogeneous cells corresponding to each other, while the double line showing the existence of converging or diverging connection between two groups of cells.

Figure 2:
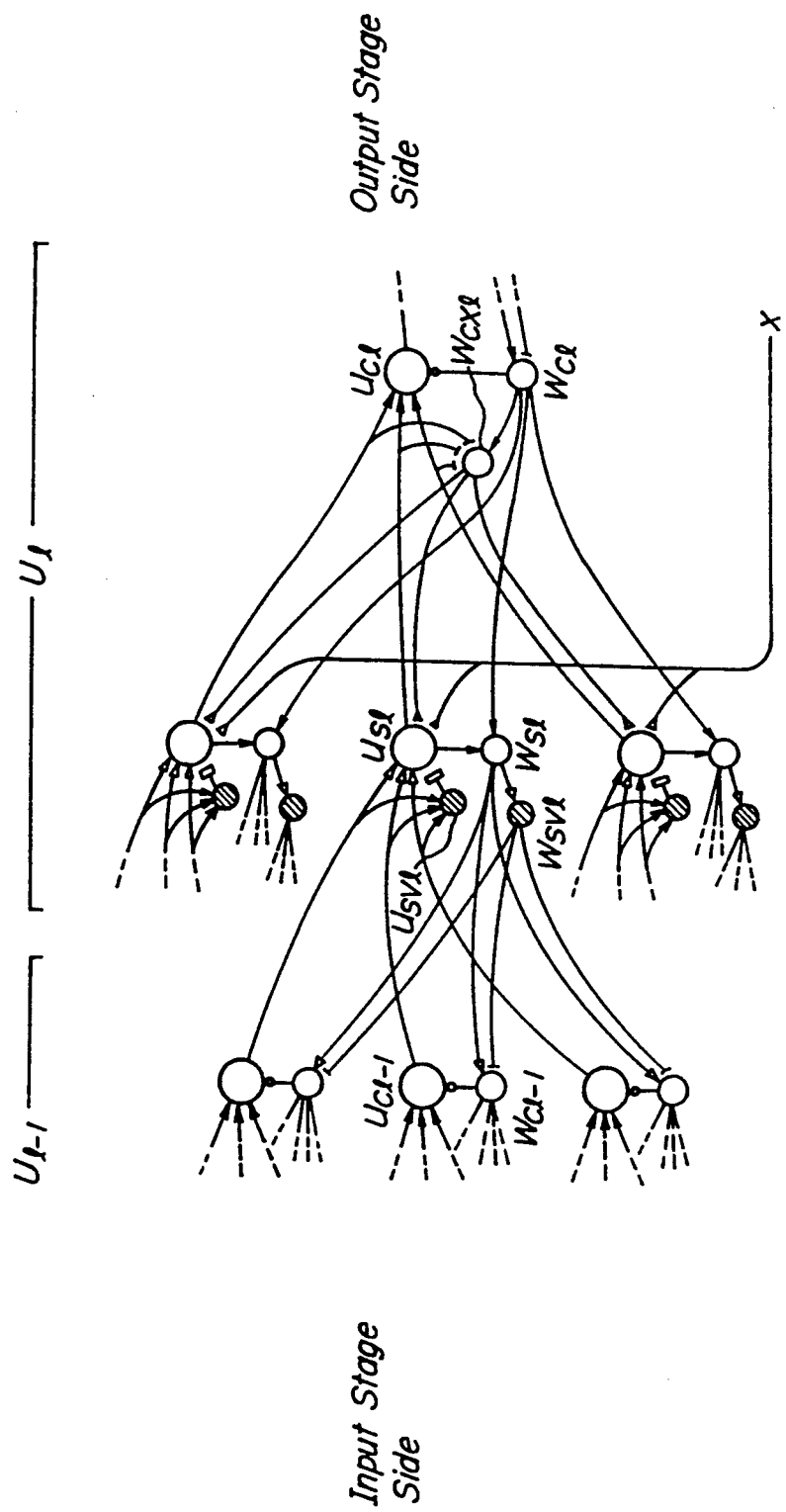
FIG. 2 is a block diagram showing an example of spatial connection between network elements in a part of the hierarchical structure as shown in FIG. 1.

In this regard, the afferent signal is processed in the same structure as that of "neocognitron" as described in the specifications of Japanese Patent Nos. 1221756 and 1279063. In this structure, a feature-extracting cell $u_s$ (including $u_{s1}$, $u_{s2}$, $u_{s3}$ and so forth) extracts the feature of the pattern in association with an inhibitory cell $u_{sv}$. Hence, only when a specified feature exists in a specified portion of the input cell-layer, an output response is derived therefrom. On the other hand, a feature-integrating cell $u_c$ extracts the same feature also. However, this cell $u_c$ receives output responses respectively derived from plural feature-extracting cells $u_s$ positioned in different portions of the input cell layers, so that, even when the position for indicating the same feature in the input layer is shifted to some extent, the feature-integrating cell $u_c$ itself continues to extract the same feature. An aspect of spatial interconnections between these cells $u_s$ and $u_c$ is shown in FIG. 2.

More specifically, all the cells employed in the neocognitron are of the analog type: i.e., the input and output signals of the cells take non-negative analog values. Each cell has characteristics analogous to a biological neuron, if we consider that the output signal of the cell corresponds to the instantaneous firing frequency of the actual biological neuron.

In the afferent signal path neocognitron, we use two different kinds of cells, i.e., S-cells and C-cells. As a typical example of these cells, we will first discuss the characteristics of an S-cell.

An S-cell has a plurality of input terminals, either excitatory of inhibitory. If the cell receives signals from excitatory input terminals, the output of the cell will increase. On the other hand, a signal from an inhibitory input terminal will suppress the output. Each input terminal has its own interconnecting coefficient whose value is positive. Although the cell has only one output terminal, it can send signals to a number of input terminals of other cells. An S-cell has an inhibitory input which causes a shunting effect.

S-cells and C-cells are excitatory cells, i.e., the output terminals of those cells are connected only to excitatory input terminals of other cells. The relation between excitatory inputs and inhibitory inputs will be described more completely by showing mathematical formulas.

As described above, the afferent signal gradually integrates local features into a global feature, as the extraction and the integration of features are repeated in each layer of the multilayered network, and hence, the feature-integrating cell $u_c$ in the final layer globally observes the feature extracted from the whole input layer, namely, the input pattern, and, as a result, what is the input pattern can be recognized.

In other words, an output response of the final cell-layer is derived from only one feature-integrating cell $u_c$ corresponding to the category of the input pattern in response to what is the category concerned. In these processes of the extraction and the intergration of features, the shift in position of these features from each other is gradually accepted, and hence, accurate pattern recognition can be realized in the final cell-layer without any affection of shift in position as well as distortion in shape of the pattern supplied to the input cell-layer.

As for the above mentioned processing of the afferent signal, the same structure of network as that of "neocognitron" as disclosed in the specification of Japanese Patent Nos. 1221756 and 1279063 can be employed.

In contrast with the above, the efferent signal is transmitted from the higher order cell-layers to the lower order cell-layers through a feature-indicating cell $w_s$ and an integrative feature-indicating cell $w_c$ which make pairs with the feature-extracting cell $u_s$ and the feature-integrating cell $u_c$ as described above, respectively. That is, the efferent signal is transmitted downwards through the path just opposite to that of the afferent signal transmitted upwards.

It is enough to attain the above situation that the coefficients of connections between each cells are arranged such as the efferent signal derived downwards from the feature-indicating cell $w_s$ is transmitted through the path just opposite to that through which the afferent signal is transmitted toward the feature-extracting cell $u_s$ paired therewith. In this regard, a feature-indicating inhibitory cell $w_{sv}$ is an auxiliary cell corresponding to an inhibitory cell $u_{sv}$ for inhibiting the afferent signal. As for the structure concerning these cells, the substantially same as that of the hierarchical information processing network as disclosed in Japanese Patent Application Laid-open Publication No. 59-163679 can be employed.

However, the path of the efferent signal transmitted downwards from the integrative feature-indicating cell $w_c$ to the feature-indicating cell $w_s$ in the preceding cell-layer cannot be individually set up for the convenience of the efferent signal concerned. It is because the feature-integrating cell $u_c$ paired with the integrative feature-indicating cell $w_c$ is arranged so as to derive an output response, whenever any one of plural feature-extracting cells $u_s$ in the preceding cell-layer derives an output therefrom. So that, the efferent signal divergently derived from the integrative feature-indicating cell $w_c$ is transmitted to plural feature-indicating cells $w_s$, these cells $w_s$ further receiving a signal operating as a gating signal from the feature-extracting cell $u_s$ corresponding thereto and hence being arranged to derive an output only when the signals are derived from both of the feature-extracting cell $u_s$ and the integrative feature-indicating cell $w_c$ thereto. According to this arrangement, as for the efferent connection from the integrative feature-indicating cell $w_c$ to the feature-indicating cell $w_s$ also, the efferent signal can be transmitted downwards through the same path as the afferent signal paired therewith and transmitted upwards from the feature-extracting cell $u_s$ to the feature-integrating cell $u_c$.

On the other hand, the efferent signal is not only affected by the afferent signal as mentioned above, but also affect the afferent signal on the contrary. That is, the fact that an output is derived from one of the feature-integrating cells $u_c$ in the highest order stage of the network means that the pattern belonging to the category corresponding to the feature-integrating cell $u_c$ concerned has been recognized through the network concerned. In this situation, the efferent signal transmitted downwards from the feature-integrating cell $u_c$ in the highest order stage is arranged so as to be supplied only to the cells directly related to the recognition of the pattern recognized in this situation. In this regard, in a situation where the input pattern supplied to the lowest order input stage is a composite pattern consisting of plural patterns, outputs of the intermediate stage in the afferent signal path are not necessarily derived only from the cells corresponding to the feature of the pattern recognized through the final stage, but also derived from the cells corresponding to the features of the remaining patterns. In order to leave only the outputs derived from the cells corresponding to the feature of the finally recognized pattern and to erase the outputs derived from the remaining cells, the feature-integrating cell $u_c$ is provided with an operational effect similar to the biological "habituation", so as to gradually lower the gain between the input and the output thereof with the lapse of time. However, in conjunction therewith, a signal for forcibly recovering the lowered gain is arranged to be supplied to the feature-integrating cell $u_c$ from the integrative feature-indicating cell $w_c$ paired therewith. As a result, the feature-integrating cell $u_c$ belonging to the afferent path, through which the efferent signal is transmitted downwards, is affected by an excitatory effect, and hence the lowering of the gain is not caused.

The output of the integrative feature-indicating cell $w_c$ does not only affect the feature-integrating cell $u_c$ upwards corresponding thereto with the excitatory effect, but also affects the feature-extracting cell $u_s$. In this regard, the fact that, although an efferent output is derived from an integrative feature-indicating cell $w_c$, any afferent output has not been derived from the feature-integrating cell $u_c$ corresponding thereto means that the feature of the pattern, which should be taken charge of by the feature-integrating cell $u_c$ concerned, fails to be extracted thereby. In this situation where, although the efferent output is derived from the integrative feature-indicating cell $w_c$, any afferent output is not derived from the feature-integrating cell $u_c$ corresponding thereto, this situation concerned is detected by a threshold controlling cell $w_{cx}$. When an output is derived from the threshold controlling cell $w_{cx}$ as a result of this detection, this output is operated so as to weaken the affection of the inhibitory, namely, negative signal supplied to the feature-extracting cell $u_s$, and hence the selectivity of the feature extraction effected by the feature-extracting cell $u_s$ concerned is weakened. In short, the feature-extracting cell $u_s$ supplied with the output of the threshold controlling cell $w_{cx}$ is forced to respond to the feature of the pattern which should be originally extracted by the feature-extracting cell $u_s$ concerned, even if the feature is incomplete to some extent. In other words, the feature-extracting cell $u_s$ is forced to be operated similarly as, when a human being observes a blurred character, a human being extracts the components of the character concerned which should exist in the blurred portions thereof with the help of the slight traces left in the blurred portions thereof.

Once the feature has been extracted by the feature-extracting cell $u_s$ on the basis of at least left slight trace thereof as described above, the efferent signal is caused to be transmitted further downwards through the feature-indicating cell $w_s$ corresponding to the feature-extracting cell $u_s$ concerned.

Under the repetition of the above-mentioned operation, only the components of the pattern which is recognized through the response of the feature-integrating cell $w_c$ in the final stage is caused to appear in the cell-layer in which the integrative feature-indicating cell $w_{co}$ of the initial stage exists. Moreover, in this situation, the efferent signal is caused to be transmitted downwards through the same path as the afferent signal corresponding to the efferent signal concerned. So that, even if the input pattern has been deformed from the previously learned training pattern, only the components corresponding to the recognized pattern appear in the cell-layer, in which the integrative feature-indicating cell $w_{co}$ of the initial stage exists, in the just same form as the deformed input pattern. Moreover, even if defected portions exist in this deformed input pattern, the interporation which naturally corresponds to the deformed input pattern is applied onto those defected portions, and hence a deformed but indefectible pattern appears in the cell-layer in which the integrative feature-indicating cell $w_{co}$ of the initial stage exists.

In this regard, a feedback signal x derived from a maximum detector MD which is presented in the right end portion of FIG. 1 is transmitted to all of the feature-extracting cells $u_s$, only when an output is not derived from all of the feature-integrating cells $u_c$ of the final stage. This feedback signal x lowers the selectivity of the response of the feature-extracting cell $u_s$ similarly as the aforesaid output of the threshold controlling cell $w_{cs}$, and hence, even if the feature of the input pattern is incomplete, the feature-extracting cell $u_s$ is arranged so as to extract the incomplete feature concerned. As a result, any one of the plural patterns supplied as the input is recognized in the first place.

As described above, only a part of the input composite pattern which corresponds to the specified one pattern of the plural patterns contained therein is separated therefrom, so as to appear in the cell-layer in which the integrative feature-indicating cell $w_{co}$ of the initial stage exists, the category of the separated pattern concerned can be determined, namely, recognized in response to which one of the plural feature-integrating cells $u_c$ of the final stage from which one output has been derived. In short, the segmentation in the pattern recognition can be effected. In this respect, if the output of the cell-layer in which the integrative feature-indicating cell $w_{co}$ of the initial stage exists is regarded as an autoassociative recall type associative output, an associative memory network which is never affected by the deformation and the positional error of the input pattern can be realized.

In this situation where any one of the plural input patterns has been recognized, for setting about the recognition of another pattern thereof, it is enough to stop the flow of the efferent signal for an instant. The feature-integrating cell $u_c$ is arranged such that, when the facilitating signal derived from the integrative feature-indicating cell $w_c$ corresponding thereto is stopped, the gain thereof lowered by the affection of habitation is restored, meanwhile the gain thereof forcibly increased by the affection of the facilitating signal is lowered in the just same manner as by fatigue in response to the extent of the forcible increase of the gain. As a result, after the above instant stop of the efferent signal, the previously recognized components of the input composite pattern has been made to hardly pass through the afferent signal path, and hence another pattern different from the initially recognized pattern is caused to be recognized. Accordingly, it is possible that various kinds of operations such as pattern recognition, segmentation, association and the like as described above is successively carried out one after another of the plural input patterns.

With regard to the extent of the modifiable synaptic connections as indicated in FIGS. 1 and 2, it is enough to vary the extent of the afferent connection by means of the autolearning as disclosed in the specificaiton of Japanese Patent No. 1279063, as well as to vary the extent of the efferent connection in association with the corresponding afferent connection by means of the method similar as disclosed in Japanese Patent Application Laid-open Publication No. 59-163679.

In this regard, various kinds of marks respectively indicating various kinds of connections and synapses together with the operations thereof are listed below. = converging or diverging connection between two groups of cells — one-to-one connection between two cells corresponding to each other →unmodifiable excitatory (positive) synapse →modifiable excitatory (positive) synapse ⊣ unmodifiable inhibitory (negative) synapse ⊸□ modifiable inhibitory (negative) synapse ⊸○ heterosynaptic facilitating signal for controlling gain of target ⊸◁ inhibition weakening signal for controlling selectivity of target cell.

INDUSTRIAL APPLICABILITY

The segmentation in the pattern recognition is extremely difficult to be applied particularly as for the modified input pattern such as handwritten characters, and hence has been conventionally effected, for instance, with the help of parallel crosses previously printed on manuscript papers.

In this regard, according to the present invention, as for any possibly deformed pattern, the segmentation can be correctly effected despite deformation.

On the other hand, with respect to the associative memory equipment, that of the conventional system has been hardly prepared so as to be satisfactorily operated, even if positional error, deformation, expansion, reduction or the like is contained in the input pattern, meanwhile that of the system according to the present invention can be prepared so as to be correctly operated without the affection of the positional error, the deformation, the expansion, the reduction or the like.

This situation can be realized by the fact that the information processing network employed for the hierarchical information system according to the present invention is newly provided with the efferent signal path together with the conventional afferent path and that such an operation is prepared between the afferent and the efferent signals, so as to facilitate the flow of those signals corresponding to each other, as well as to attenuate the flow of those signals not corresponding to each other.

As is apparent from the mentioned above, according to the hierarchical information processing system of the present invention, it is possible to realize a novel pattern recognition equipment provided with an extremely higher grade faculty being quite different from the conventional one such that the segmentation is effected by separating only a portion corresponding to one specified pattern from plural input patterns and that the autoassociative recall type associative memory is effected for interpolating defected portions of the input pattern. Besides, in this situation also, the similar faculties as of "neocognitron" as disclosed in the specification of Japanese Patent Nos. 1221756 and 1279063 are naturally maintained such as the correct pattern recognition can be effected without the affection of the distortion in shape, the shift in position, the expansion or the reduction of the input pattern.

DETAILED DESCRIPTION OF THE STRUCTURES AND THE INTERCONNECTIONS OF VARIOUS KINDS OF CELLS

The structures and the interconnections of various kinds of cells which are employed in an exemplified block diagram as shown in FIG. 1 of the hierarchical structure of the neural circuit model adopted for the hierarchical information processing system according to the present invention will be concretely described hereinafter by referring to the hardwares thereof.

Before the concrete description of individual cells, a circuit arrangement presenting the performance of Weber-Fechner type which is used for the feature extraction which is one of important functions of the neural circuit model, and thereafter detailed structures of individual cells will be described in order.

In this connection, the circuit arrangement of Weber-Fechner type has been disclosed in detail by the present inventor in Japanese Patent Laid-open Publication No. 51-35,255 as essentially referred hereinafter.

(1) Circuit arrangement of Weber-Fechner type

First, distinctions of the input to output performance of this circuit arrangement will be described by referring to equations.

This circuit arrangement consists of multi-input to one-output type provided with positive namely excitatory inputs and negative namely inhibitory inputs, these inputs and one output of this circuit arrangement being furnished with respective analog values of zero or positive namely not-negative value.

In a situation where inputs $u_1, u_2, \ldots, u_N$ are supplied to N positive input terminals respectively, while the other inputs $v_1, v_2, \ldots, v_M$ are supplied to M negative input terminals respectively, the output W of this circuit arrangement is defined by the following equation.

$$W = \phi \left[ \frac{1 + \sum_{n=1}^{N} a_n \cdot u_n}{1 + \sum_{m=1}^{M} b_m \cdot v_m} - 1 \right] \quad (1)$$

where $$\phi(x) = \begin{cases} x & (x \geq 0) \\ 0 & (x < 0) \end{cases} \quad (2)$$

In this regard, $a_n$ and $b_m$ are gains of n-th positive input terminal and m-th negative input terminal respectively, the values thereof being generally increased as the self-organization is progressed.

The circuit arrangement concerned presents performances specified as follows.

For simplicity, an excitatory whole input e and an inhibitory whole input h are defined by the following equations respectively.

$$e = \sum_{n=1}^{N} a_n \cdot u_n \quad (3)$$

$$h = \sum_{m=1}^{M} b_m \cdot v_m \quad (4)$$

According to these definitions, the equation (1) can be expressed by the following equation.

$$W = \phi \left( \frac{1 + e}{1 + h} - 1 \right) = \phi \left( \frac{e - h}{1 + h} \right) \quad (5)$$

As it is apparent from this equation (5), the excitatory input is supplied in a form of total sum of values defined by the equation (3), so as to take effect additively, while the inhibitory input takes effect in shunt as expressed by the term $$\frac{1+e}{1+h}$$

of the equation (5).

When the inhibitory whole input h is small, that is, the condition $0 \leq h < < 1$ is satisfied, the equation (5) can be approximately expressed as follows.

$$W \simeq \phi(e-h) \qquad (6)$$

This expression is coincident to the performance of the "analog threshold element", the faculty of which has been conveniently recognized to be that of the model of neural system or the visual pattern processing circuit.

On the other hand, in a situation where the excitatory whole input e and the inhibitory whole input h are increased in proportion to each other, that is, the condition $e = \epsilon x$, $h = \eta x$ is satisfied, the equation (1) is expressed as follows.

$$W = \frac{(\epsilon - \eta)x}{1 + \eta x} \qquad (7)$$

where $\epsilon$ and $\eta$ are constant and $\epsilon > \eta$. This expression corresponds to the input to output performance consisting of the logarithmic performance of Weber-Fechner type added with a saturation performance, and hence is coincident to that which is generally adopted as an empirical formula for approximating the nonlinear input to output performance of sense system in the physiology and the psychology. Accordingly, a circuit provided with the input to output performance similar to that of a live body can be realized by employing the circuit arrangement concerned as a constant of the processing circuit for visual information and aural information.

Various structural examples of the aforesaid circuit arrangement provided with the input to output performance as defined by the equation (1) will be described hereinafter by referring to accompanied drawings.

FIG. 3 shows an example of the circuit arrangement employing adjustable resistors of voltage control type.

In this exemplified circuit arrangement the excitatory inputs $u_1, u_2, \ldots, u_N$ are supplied to an operational amplifier 2 in a form of total sum thereof obtained by common connection through gain-controlling adjustable resistors 1-1, 1-2, ..., 1-N respectively. An output of this operational amplifier 2 is fed back to the input terminal of the amplifier concerned through a voltage control type adjustable resistor 3. A controlling voltage input terminal of this adjustable resistor 3 is supplied with the total sum h of inhibitory inputs $v_1, v_2, \ldots, v_M$ which is obtained by common connection through gain-controlling adjustable resistors 4-1, 4-2, ..., 4-M respectively, so as to obtain an output corresponding to the term $1/(1+h)$. Besides, an input terminal of the operational amplifier 2 is connected also with a voltage source 6 of a standard voltage (a voltage of unit 1) through a resistor 5. Thereby, an output $$\left( -\frac{1+e}{1+h} \right)$$

is derived from the operational amplifier 2, so as to be supplied to a second operational amplifier 8 through a resistor 7. An output of this operational amplifier 8 is fed back to the input side thereof through a resistor 9, to which side the standard voltage from the voltage source 6 is supplied also through a resistor 10. Thereby, the output $$\left( \frac{1+e}{1+h} - 1 \right)$$

is obtained from the second operational amplifier 8, which satisfies the relation of the equation (5). In addition, this output is supplied to a half-wave rectifier circuit 11, so as to obtain the output W.

FIG. 4 shows another example of the circuit arrangement a multiplying element. In this exemplified circuit arrangement, the excitatory inputs $u_1, u_2, \ldots, u_N$ are supplied to respective positive input terminals of a linear summation element 12 through gain-controlling resistors 1-1, 1-2, ..., 1-N respectively, while the inhibitory inputs $v_1, v_2, \ldots, v_M$ are supplied to respective positive input terminals of another linear summation element 13 through gain-controlling resistors 4-1, 4-2, . . ., 4-M. The output h of this element 13 is supplied to a negative input terminal of the summation element 12 and further to a multiplying element 14 also. This multiplying element 14 is supplied with an output r of the summation element 12 also, so as to derive a product hr of both inputs h and r, which product is supplied to a negative input terminal of the aforesaid summation element 12. The output r as defined by the following equation is derived from this summation element 12.

$$e - h - hr = r$$

This equation can be reformed as follows.

$$r = \frac{e-h}{1+h} \qquad (8)$$

This reformed equation satisfies the relation of the equation (5). This output r is supplied to the half-wave circuit 11 similarly as in the aforesaid exemplified arrangement, so as to obtain the output W.

Next, FIG. 5 shows still another example of the circuit arrangement employing a dividing element. In this exemplified circuit arrangement, the excitatory inputs $u_1, u_2, \ldots, u_N$ are supplied to respective positive input terminals of still another linear summation element 15 through gain-controlling adjustable resistors 1-1, 1-2, . . ., 1-N respectively, while the inhibitory inputs $v_1, v_2, \ldots, v_M$ are supplied to respective positive input terminals of still another linear summation element 16 through gain-controlling adjustable resistors 4-1, 4-2, . . ., 4-M respectively, so as to obtain a total sum h thereof. This total sum output h is supplied to a negative input terminal of the aforesaid summation element 15, so as to obtain the output $(e-h)$, and further is supplied to first positive input terminal of still another linear summation element 17 also, which element 17 has a second positive input terminal, so as to obtain the output (1+h) by supplying the standard voltage (+1) to the second positive input terminal. In succession thereto, the respective outputs (e−h) and (1+h) of the summation elements 15 and 17 are supplied to a dividing element 18, so as to obtain an output $$\frac{e-h}{1+h}.$$

This output satisfies the relation of the equation (5) and hence is supplied to the half-wave rectifier circuit 11 similarly as in the above exemplified arrangement, so as to obtain the output W.

In addition, FIG. 6 shows further another example of the circuit arrangement employing an element having the shunt type performance. In this exemplified circuit arrangement, the process in which the output (e−h) is derived from the linear summation element 15, while the output h is derived from the linear summation element 16 is similar to that in the example aforesaid by referring to FIG. 5. However, in this example as shown in FIG. 6, these outputs (e−h) and h are supplied to an element 19 having the shunt performance, so as to obtain the output $$\frac{e-h}{1+h}.$$

The process succeeding thereto is similar to that in the aforesaid example and hence the output W is derived from the half-wave rectifier circuit 11.

In each of the aforesaid examples, the gain-controlling adjustable resistors 1-1 to 1-N and 4-1 to 4-M can be formed of those such as the resistivity is varied by driving a conventional adjustable resistor in response to a controlling signal or by any electronic means such as FET, and further can be replaced by fixed resistors in case the function of self-organization is not necessarily required.

As described above, the circuit arrangement presenting a Weber-Fechner type logarithmic performance can be provided by the above several examples, and hence can be employed as the constituent of the self-organizing circuit in a benefitable situation where any fear that the output is infinitely increased as the input gain is increased, similarly as in the conventional circuit arrangement and further the composition of self-organization system is facilitated, that is, the readjustment of gain is not necessary and hence the circuit arrangement is simplified.

Moreover, the circuit presenting input-to-output performance similar to the sense system of a live body can be readily realized by the aforesaid circuit arrangement, so that the aforesaid circuit arrangement is benefitable for processing informations afforded by visual sense, aural sense, tactile sense and the like.

Under the preliminary knowledge wellknown ass described above, each constituent cells of the neural circuit model as shown in FIG. 1 according to the present invention will be concretely described hereinafter in order.

(2) Feature Extracting Cell $u_s$

Figure 7:
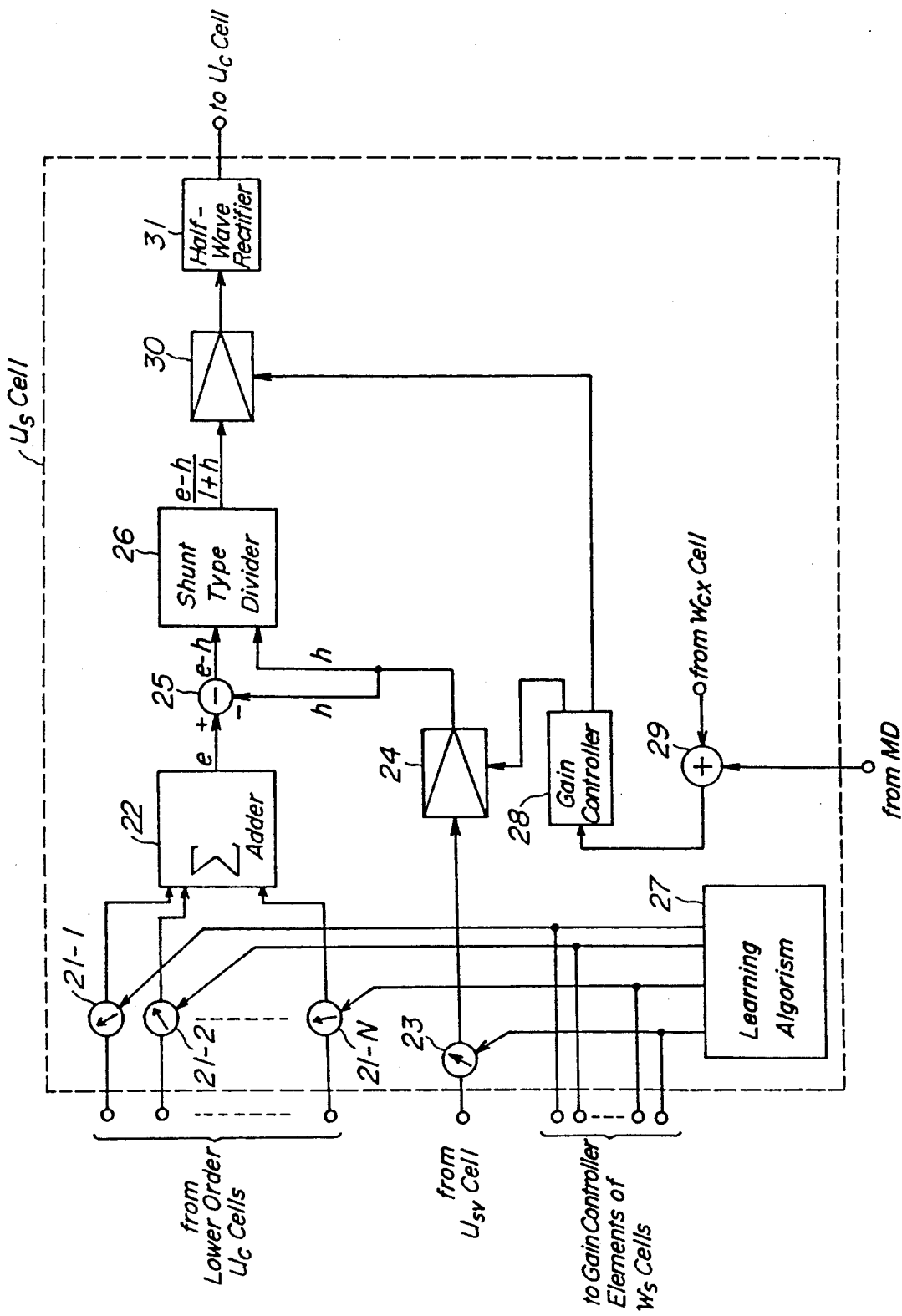

An exemplified structure of the $u_s$ cell according to the present invention is shown in FIG. 7.

As is apparent from FIG. 7, each constituents of this $u_s$ cell circuit arrangement according to the present invention, that is, input terminals corresponding to the lower order of feature-integrating cell $u_c$, an input terminal corresponding to the feature-extracting inhibitory cell $u_{sv}$, gain-adjustable elements 21-1, 21-2, ..., 21-N, an adder 22, a gain-adjustable element 23, gain-adjustable amplifier 24, a subtractor 25, a shunt type divider 26, gain-adjustable amplifier 30, a half-wave rectifier 31, and output terminals corresponding to the higher order $u_c$ cells are just the same to those in the wellknown conventional circuit arrangements exemplified as shown in FIGS. 3 to 6 respectively.

In other words, the input terminals receiving signals from the lower order of feature integrating cells $u_c$ correspond to the aforesaid excitatory input terminals $u_1, u_2, \ldots, u_N$ respectively, and the gain-adjustable elements 21-1, 21-2, ..., 21-N correspond to the gain-controlling adjustable resistors 1-1, 1-2, ..., 1-N respectively. On the other hand, it is satisfactory that the output of the gain-adjustable element 23 is similar to that of the linear summation element 13 having the inhibitory inputs. Besides, the learning algorism 27 is provided for making the neutral circuit model of the present invention to visually sense the specified by the learning before effecting the pattern recognition and discrimination of the visual pattern, so as to previously set the intensity of the connection between each cells, that is, concretely speaking, so as to previously set the gain-adjustable elements.

The significant difference of the structural example as shown in FIG. 7 from the conventional structure is the connection of the respective inputs from the $w_{cx}$ cell and the MD circuit with the gain controller 28. The input from the threshold controlling cell $w_{cx}$ is provided for controlling the threshold of the selectivity for feature extraction in the $u_s$ cell such as the selectively concerned in response to the input from the $x_{cx}$ cell, while any more or less distorted pattern is regarded as within the specified pattern, so as to adjust the gain of this circuit element for reducing the output h.

On the other hand, the input from the MD circuit is the feedback signal x from the maximum detector MD as shown in FIG. 1, which feedback signal x is generated when any of $u_{c3}$ cells in the last stage of this neural circuit model does not generate its own output, so as to moderate the selectivity for feature extraction also.

These circuit elements effect the function such that the neural circuit model is made to previously learn plural specified patterns, and hence, for instance, in a situation where, although any of those specified patterns is presented thereto, all of the outputs thereof are zero, the selection width of feature extraction, which is regarded as narrow, is spread.

(3) Feature-extracting Inhibitory Cell $u_{sv}$ paired with the feature-extracting cell $u_s$ This feature-extracting inhibitory cell $u_{sv}$ is employed for deriving an inhibitory input signal to be supplied to the aforesaid feature-extracting cell $u_s$ from the lower order $u_c$ cells, as exemplified as shown in FIG. 8. In this exemplified circuit arrangement, the square type nonlinear amplifier 36, the adder 37 and the square root type amplifier 38 are arranged such as a root mean square type result is obtained from outputs of the lower order $u_c$ cells. However, the obtained result is not restricted to this type, and hence it can be experientially arranged such as the inhibitory signal more efficiently functions according to the combination of the result of this type with the $u_{sv}$ cell.

(4) Feature Integrating Cell $u_c$

FIG. 9 shows a structural example of this cell $u_c$. This cell $u_c$ receives respective outputs of plural $u_s$ cells and, even if the position of pattern presentation on the input layer is somewhat shifted, this cell $u_c$ maintains its outputs. Besides, the output concerned is controlled by the signal derived from the cell $W_c$ on the efferent signal path through the gain controller 41 and the gain-adjustable amplifier 42. The fixed-gain elements 39-1, 39-2, . . . , 39-N are employed for receiving the signals derived from the $u_s$ cells within the fixed mutual relation.

(5) Threshold Controlling Cell $w_{cx}$

FIG. 10 shows a structural example of this cell $w_{cx}$. In this structural example, the input signal is derived from the cell $u_s$ through the fixed-gain elements 46 respectively and mutually added through the adder 47, the output of which is subtracted from the signal derived from the cell $w_c$ and the subtraction output concerned is fed-back to the cells $u_s$ through respective half-wave rectifiers 49, so as to effect the adjustable excitatory connections therebetween.

Both of the cells $u_s$ on each layers belonging to the afferent signal path and the cells $w_c$ on each layers belonging to the efferent signal path in the circuit arrangement as shown in FIG. 1 are simultaneously operated in the normal operation of this neural circuit model such as both of afferent and efferent signals or zero signals are output respectively.

In a situation where the aforesaid balanced operation is disturbed, that is, for instance, although the efferent signal is derived from the cell $w_c$, the afferent signal is not derived from the cell $u_s$, this cell $w_{cx}$ is activated such as the output thereof excitatorily affects the cell $u_s$, so as to forcibly derive the output from the cell $u_s$ concerned. In other words, the cell $w_{cx}$ moderates the threshold of selectivity in the cell $u_s$, so as to facilitate the output of the cell $u_s$ through the afferent signal path.

(6) Feature Integrating Cells $w_s$

Figure 11:
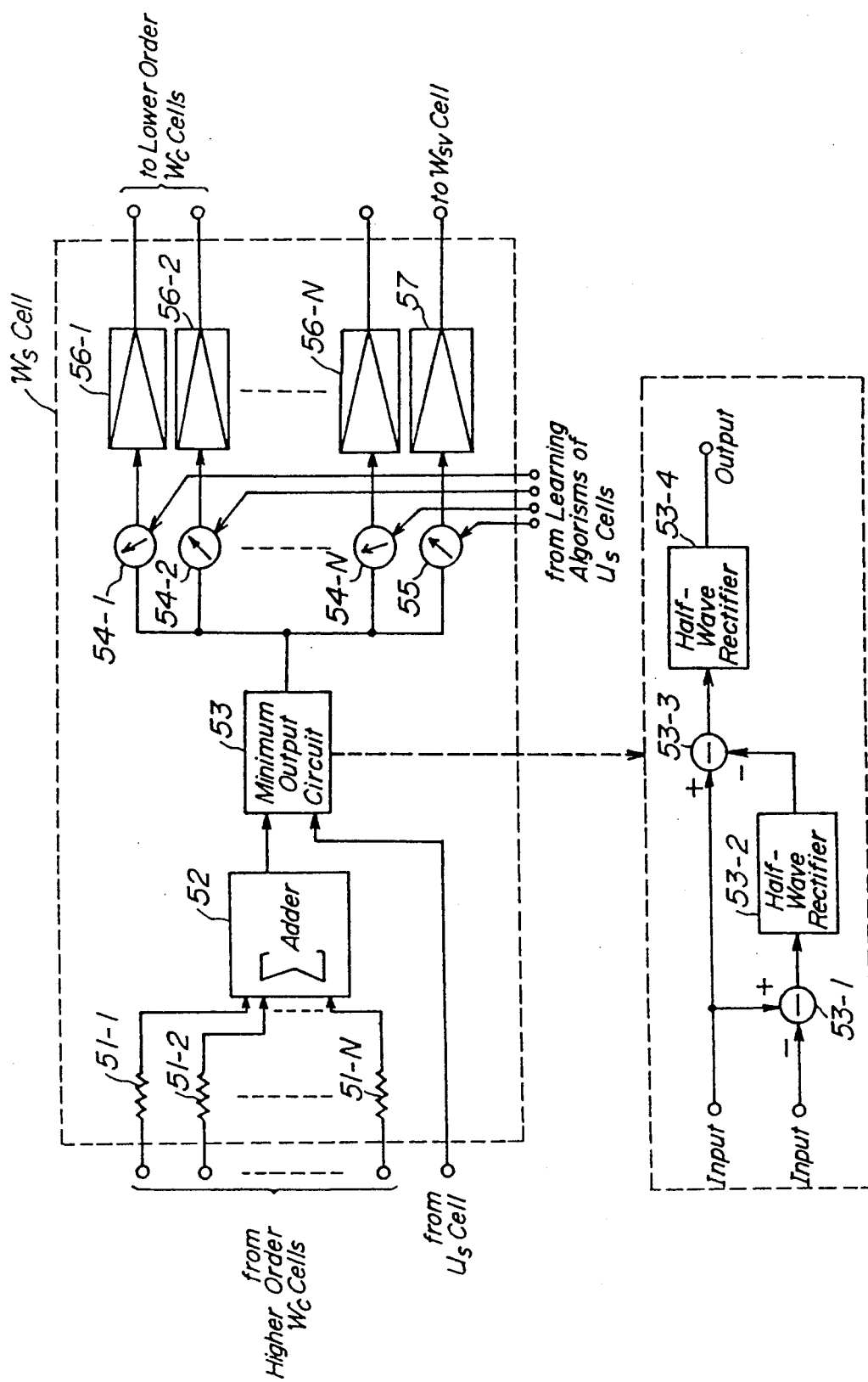

FIG. 11 shows a structural example of this cell $w_s$ belonging to the efferent signal path in the neural circuit model. In this connection, all of kinds of cells described hereinafter as shown in FIGS. 11 to 14 belong to the efferent signal path.

This cell $w_s$ receives the signals derived from the higher order $w_c$ cells and the signal derived from the $u_s$ cell on the same layer. Those input signals from the higher order $w_c$ are supplied to an adder 52 through fixed-gain elements 51. The output signal of the adder 52 is compared with the input signal supplied from the same order $u_s$ cell in a minimum output circuit 53, so as to selectively output the smaller signal among those compared signals. This output signal is efferently transmitted to the lower order $w_c$ cells and the $w_{sv}$ cell successively through gain-adjustable elements 54-1, 54-2, . . . , 54-N and 55 and thereafter buffer amplifiers 56-1, 56-2, . . . , 56-N and 57 respectively.

In the aforesaid circuit arrangement, the minimum output circuit 53 is provided for selectively gating the efferent signals from the higher order $w_c$ cells in response to the signal derived from the same order $u_s$ signal, so as to control the signal transmission through the efferent signal path in this neural circuit model.

(7) Feature Integrating Inhibitory Cell $w_{sv}$ paired with the feature indicating cell $w_s$ This cell $w_{sv}$ is connected with the feature integrating cell $w_s$ in pair and hence the output thereof is transmitted to the plural lower order $w_c$ cells through efferent connections respectively. For simplicity, a drawing for exhibiting the structural example thereof is omitted.

(8) Integrative Feature Indicating Cell $w_c$

FIG. 12 shows a structural example of this cell $w_c$, in which adders 58, 59, a subtractor 60 and a half-wave rectifier 61 are simply arranged as shown in the drawing, so that the detailed description of the operation thereof is omitted.

(9) Photo-Electric Converting Cell $u_{co}$

Figure 13:
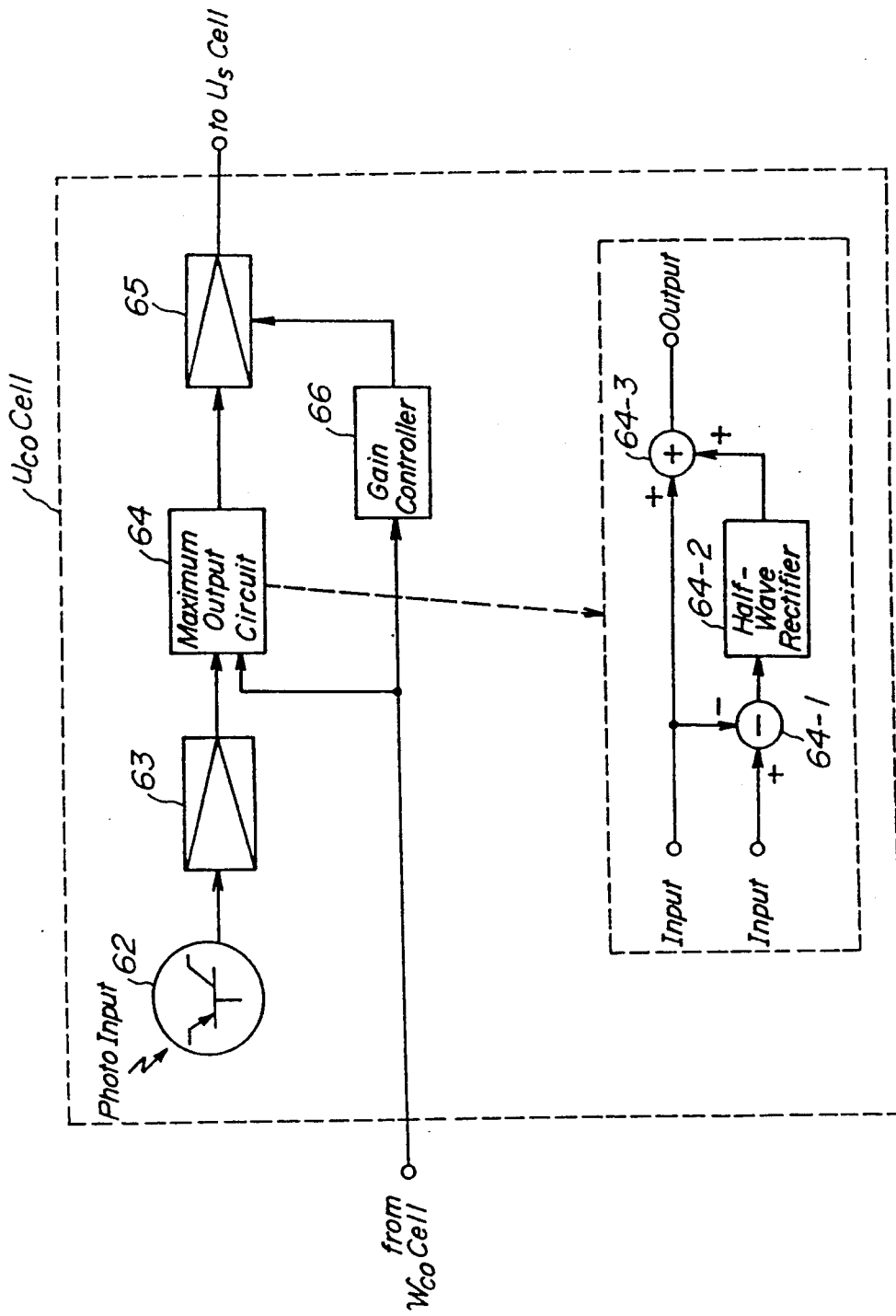

FIG. 13 shows a structural example of this cell $u_{co}$, in which a phototransistor 62, a buffer amplifier 63, a maximum output circuit 64, a gain-adjustable amplifier 65 and a gain controller 66 are arranged such as the initial signal on the afferent signal path is adjustably excitatorily controlled by the final cell $w_{co}$ on the efferent signal path. In this connection, it is conventional that plural $u_{co}$ cells are arranged in matrix on the same plane.

(10) Maximum Detector MD

Maximum detector circuit MD is provided for detecting the $u_{c3}$ cell generating the maximum output among plural $u_{c3}$ cells, so as to derive the output "1" from the AND gate 71 corresponding to the $u_{c3}$ cell concerned, in the situation where the maximum output $u_{c3}$ is detected. On the contrary, in the situation where the maximum output $u_{c3}$ cell is not detected, that is, all of the output of those plural $u_{c3}$ cells are zero, all of outputs of plural AND gates 71 are zero also, and hence the signal x is output therefrom as the efferent signal.

FIG. 14 shows a structural example of this circuit MD, in which plural amplifiers 67 individually consist of saturation amplifiers or threshold elements for generating the output "1" when the output is positive, while for generating the output "0" when the input is zero or negative. In this connection, plural comparators 68 and 69 respectively present the performance such that, when the positive input is equal to or larger than the negative input, the output "1" is derived therefrom.

THE STRUCTURE AND BEHAVIOR OF THE NETWORK (1) An outline of the Structure of the Network The model is a multilayered network consisting of a cascade of many layers of neural cells. Like the neocognitron or the hierarchical associative-memory model, the cells are of analog type; that is, their inputs and output take non-negative analog values corresponding to the instantaneous firing-frequencies of biological neurons. There exist both afferent and efferent connections between cells in adjoining cell-layers.

The heirarchical structure of the network in the present invention is illustrated in FIG. 1. Let the initial stage of the heirarchical network be called $U_o$, the l-th stage $U_l$ and the highest stage $U_L$. Incidentally, FIG. 1 shows the case of L=3. The mark o in the figure represents a cell. Although cells of each kind actually exist in numbers, only one cell is drawn in each stage. Between these cells, there are synaptic connections denoted by single lines and double lines in FIG. 1. A single line indicates that there are one-to-one connections between the two groups of cells, and a double line indicates that there are converging or diverging connections between them. A detailed diagram, illustrating spatial interconnections between neighboring cells, is shown in FIG. 2.

At each stage, various kinds of cells, such as $u_s$, $u_c$, $u_{sv}$, $w_s$, $w_c$, $w_{sv}$, and $w_{cx}$, are severally arranged in two dimensional arrays. Notation $U_{cl}$, for example, is used to denote the layer of $u_C$-cells in the l-th stage. In the following equations, the output of $u_S$-cell in the l-th stage, for example, is denoted by $u_{Sl}^t(n, k)$, where n is two-dimensional co-ordinates indicating the position of the cell's receptive-field center in the input layer $U_{co}$, and $k(=1, 2, \ldots, K_l)$ is a serial number indicating the type of feature which the cell extracts. Time t is assumed to take a discrete integer value. Incidentally, since we have $K_o=1$ in stage $U_o$, the output of a $u_C$-cell, for example, might be denoted by $u_{co}^t(n)$, in which k is abbreviated.

Just as in the neocognitron, the density of cells in a layer is designed to decrease with the order of the stage, because the cells in higher stages usually have larger receptive fields. Especially in the highest stage, only one $u_C$-cell and $w_C$-cell exist for each value of k. Hence, expressions like $u_{CL}^t(k)$, in which n is abbreviated, are sometimes used to denote the output of such cells.

(2) Afferent Connections

If we consider afferent connections only, the network has a structure and function similar to those of the neocognitron. (Cells $u_S$, $u_C$, and $u_{sv}$ correspond respectively to the S-, C-, and V-cells in the neocognitron.)

After finishing the learning (or training) process, feature-extracting cells $u_S$, with the aid of the feature extracting inhibitory cells $u_{sv}$, extract features from the stimulus pattern (FIG. 2): that is, a $u_S$-cell is activated only when a particular feature is presented at a certain position in the input layer. The feature which the $u_S$-cells extract are automatically chosen by the model itself during the process of learning in the same way as in the neocognitron. In lower stages, local features, such as a line of a particular orientation, are extracted. In higher stages, more global features, such as a part of a training pattern, are extracted.

On the other hand, a $u_C$-cell receives signals from a group of $u_S$-cells, all of which extract the same feature but from slightly different positions, and is activated if at least one of these $u_S$-cells is activated. Therefore, even if the feature is presented at a slightly different position, the $u_C$-cell usually still responds.

Thus, in the afferent paths, the processes of feature extraction by the $u_S$-cells and the toleration of positional shift by the $u_C$-cells are repeated, and local features are gradually integrated into more global features. Finally, the $u_{CL}$-cells (i.e., the $u_C$-cells in the highest stage, or the gnostic cells) integrate all the information in the stimulus pattern, and recognize it. In other words, in the highest stage, only one $u_{CL}$-cell, corresponding to the category of the stimulus pattern, is activated. Since errors in the relative position of local features are tolerated in this process of extraction and integration, the response of the $u_{CL}$-cells in the highest stage is affected neither by a shift in position nor by a deformation in shape of the stimulus pattern.

Mathematically, the output of a $u_S$-cell of stage $U_l$ is given by $$u_{Sl}^t(n,k) = r_l^t(n,k) \cdot \tag{9}$$

$$\phi \left[ \frac{\sigma_l + \sum_{\kappa=1}^{K_{l-1}} \sum_{\nu \in A_l} a_l(\nu,\kappa,k) \cdot u_{Cl-1}^t(n + \gamma,\kappa)}{\sigma_l + \frac{r_l^t(n,k)}{1 + r_l^t(n,k)} \cdot b_l(k) \cdot u_{sv_l}^t(n)} - 1 \right]$$

where $$\phi[x] = \begin{cases} x & \text{if } x \geq 0 \\ 0 & \text{if } x < 0 \end{cases} \tag{10}$$

Parameter $\sigma_l$ is a positive constant determining the level at which saturation starts in the input-to-output characteristic of the cell. $a_l(\nu,\kappa,k)(\geq 0)$ is the strength of the modifiable excitatory synapse coming afferently from cell $u_{Cl-1}^t(n+\nu,\kappa)$ in the preceding stage $U_{l-1}$, and $A_l$ denotes the summation range of $\nu$, that is, the size of the spatial spread of the afferent synapses to one $u_S$-cell. $b_l(k)(\geq 0)$ is the strength of the modifiable inhibitory synapse coming from inhibitory cell $u_{sv_l}(n)$.

These modifiable synapses are reinforced by means of a similar algorithm to that used for learning-without-a-teacher in the neocognitron, and each $u_S$-cell comes to respond selectively to a particular feature of the stimulus. In this specification, however, we shall consider only the state after learning, and assume that the synapses have already lost their modifiability.

As can be seen from formula (9), the inhibitory input to this cell acts in a shunting manner. The positive variable $r_l^t(n,k)$, which will be further discussed later, determines the efficiency of the inhibitory input to this cell.

The inhibitory cell $u_{sv}$ which sends an inhibitory signal to this $u_S$-cell yields an output equal to the weighted root-mean-square of the signals from the presynaptic $u_C$-cells, that is, $$u_{sv_l}^t(n) = \sqrt{\sum_{\kappa=1}^{K_{l-1}} \sum_{\nu \in A_l} c_l(\nu) \cdot \{u_{Cl-1}^t(n + \nu,\kappa)\}^2} \tag{11}$$

where $c_l(\nu)$ represents the strength of the excitatory unmodifiable synapses, and is monotonically decreasing function of $|\nu|$, which satisfies $$\sum_{k=1}^{K_{l-1}} \sum_{\nu \in A_l} C_l(\gamma) = 1 \tag{12}$$

Incidentally, $u_{sv}$-cells have the same characteristics as the root-mean-square cells introduced in the model "cognitron".

The $u_C$-cells, which correspond to the C-cells in the neocognitron, are inserted in the network to tolerate positional errors in the features of the stimulus. The output of a $u_C$-cell is given by $$u_{Cl}^t(n,k) = g_l^t(n,k) \cdot \Psi \left[ \sum_{\nu \in D_l} d_l(\nu) \cdot u_{Sl}^t(n + \nu,k) \right] \tag{13}$$

where $\Psi[\ ]$ is a function specifying the characteristic of saturation, and is defined by $$\Psi[x] = \frac{\phi[x]}{1 + \phi[x]} \tag{14}$$

Parameter $d_l(\nu)$ denotes the strength of the excitatory unmodifiable synapses, and is a monotonically decreasing function of $|\nu|$. Hence, if at least one presynaptic $u_S$-cell is activated in the area $D_l$, to which these connections spread, this $u_C$-cell is also activated.

The variable $g_l^t(n,k)$ denotes the gain of the $u_c$-cell, and its value is controlled by the signal from the $w_c$-cell in the efferent path.

(3) Efferent Connections

Efferent signals are transmitted to lower-order cells through $w_S$-cells and $w_c$-cells, which make pairs with $u_S$-cells and $u_c$-cells respectively. Here, the efferent signals are made to retrace the same paths as the afferent signals in the opposite direction.

(3)-1 The Efferent Connections from $w_S$-Cells to $w_c$-Cells

Let us consider the efferent signals from an arbitrary $w_S$-cells to the $w_c$-cells of the preceding stage (FIG. 2). Just as in the case of the hierarchical associative memory model, it is assumed that there exists a mechanism to control the strength of the synapses in the following manner: after finishing the process of learning, the efferent connections descending from a $w_S$-cell are made to have a strength proportional to the afferent connections ascending to the $u_S$-cell which makes a pair with the $w_S$-cell.

Thus, the output of a $w_c$-cell is given by $$w_{Cl}^t(n,k) = \Psi \left[ a_l \cdot \left\{ \sum_{\kappa=1}^{K_{l+1}} \sum_{v \in A_{l+1}} a_{l+1}(v,k,\kappa) \cdot u_{Sl+1}^t(n-v,k) - \sum_{v \in A_{l+1}} c_{l+1}(v) \cdot w_{svl+1}^t(n-v) \right\} \right] \quad (15)$$

where $a_l$ is a positive constant.

As you may seen by comparing of this equation to formula (9), the efferent signals descending from the $w_S$-cell are transmitted in the opposite direction through the same paths as the afferent signals ascending to the $u_S$-cell. The inhibitory efferent signals via the $w_{sv}$-cell, a subsidiary inhibitory cell corresponding to the $u_{sv}$-cell in the afferent paths, are also transmitted in the opposite direction through the same paths as the afferent signals ascending via the $u_{sv}$-cell.

The output of the subsidiary inhibitory cell $w_{sv}$ is given by $$w_{svl+1}^t(n) = \frac{T_{l+1}^0}{1 + T_{l+1}^0} \sum_{\kappa=1}^{K_{l+1}} b_{l+1}(\kappa) \cdot w_{sl+1}^t(n,k) \quad (16)$$

That is, the efferent connection from $w_{sl+1}$- to $w_{svl+1}$-cell is the same as the afferent connection from $u_{svl+1}$- to $u_{sl+1}$-cell, where only the direction of the signal flow is reversed. The only difference between the efferent and the afferent paths is that the $w_{sv}$-cell in the efferent paths has a linear input-to-output characteristics, while the $u_{sv}$-cell in the afferent paths has a root-means-square characteristic. The parameter $T_l^p$ in formula (16) is the initial value of the variable $T_l^t(n,k)$ in (9), and will be discussed later in connection with formula (22).

As a result of the network structure described above, if an excitatory afferent path is formed to a $u_S$-cell from a $u_c$-cell, an excitatory efferent path comes to be formed automatically from the corresponding $w_S$-cell to the corresponding $w_c$-cell. When the afferent inhibitory path via the inhibitory $u_{sv}$-cell is stronger than the direct excitatory path from the $u_c$-cell, the efferent inhibitory path to the $w_c$-cell via the inhibitory $w_{sv}$-cell becomes stronger than the direct excitatory path from the $w_S$-cell, and the $w_c$-cell comes to receive an inhibitory overall effect from the $w_S$-cell. In short, depending on whether a $u_S$-cell is afferently receiving an overall excitatory or inhibitory effect from a $u_c$-cell, the corresponding $w_c$-cell also receives efferently an overall excitatory or inhibitory effect from the corresponding $w_S$-cell.

(3)-2 Efferent Connections from $w_c$-Cells to $w_S$-Cells

Corresponding to the afferent connections which converge to a $u_c$-cell from a number of $u_S$-cells, many efferent connections diverge from a $w_c$-cell towards $w_S$-cells (FIG. 2). It is not desirable, however, for all the $w_S$-cells which receive excitatory efferent signals from $w_c$-cells to be activated. The reason is as follows: to activate a $u_c$-cell, the activation of at least one presynaptic $u_S$-cell is enough, and usually only a small number of presynaptic $u_S$-cells are actually activated. In order to elicit a similar response from the $w_S$-cells in the efferent paths, the network is synthesized in such a way that each $w_S$-cell receives not only excitatory efferent signals from $w_c$-cells but also a gate signal from the corresponding $u_S$-cell; and it is activated only when it receives a signal both from $u_S$- and $w_c$-cells.

Thus, the output of a $w_S$-cell is given by $$w_{Sl}^t(n,k) = \min \left[ u_{Sl}^t(n,k), \sum_{v \in D_l} d_l(v) \cdot w_{Cl}^t(n-v,k) \right] \quad (17)$$

where min[ ] is a function which takes the smaller value of the two arguments.

Because of this network architecture, in the efferent paths from $w_c$-cells to $w_S$-cells, the signals retrace the same route as the afferent signals from $u_S$-cells to $u_c$-cells.

(4) The Action of Efferent on Afferent Signals (4)-1 Facilitation

As described above, efferent signal flow is affected by afferent signals. Efferent signals, however, are affected not only by afferent signals, but also influence the afferent signals flow. Activation of a single $u_{CL}$-cell in the highest stage means that the network has recognized a pattern of a category which corresponds to the activated $u_{CL}$-cell. Efferent signals descending from the activated $u_{CL}$-cell are now sent only to cells relevant to the recognition of the pattern now recognized. If the stimulus presented to the input layer $U_{CO}$ contains two patterns or more, in the intermediate stages of the afferent paths, not only cells corresponding to features of the pattern now recognized at the highest stage, but also cells corresponding to features of the other patterns are usually activated. In order to preserve only the output of cells relevant to the features of the finally-recognized pattern and to suppress the output of the other cells, each $u_c$-cell is assumed to have the characteristic of "habituation", by which the gain between the inputs and the output of the cell is gradually attenuated with the passage of time. At the same time, however, the $u_c$-cell receives a facilitating signal from corresponding $w_c$-cell. This facilitating signal forces the attenuated gain to recover. Consequently, $u_c$-cells in the paths in which efferent signals are flowing do not have their gain attenuated because of the facilitation effect.

Quantitatively, the gain of a $u_c$-cell in the afferent paths [see (13)] is given by $$g_l^t(n,k) = \gamma_l \cdot g_l^{t-1}(n,k) + (1 - \gamma_l) \cdot \phi[\gamma_l' w_{Cl}^{t-1}(n,k)] \quad (18)$$

where $\gamma_l$ is a constant determining the speed of habituation of the $u_C$-cells, and lies in the range $0 < \gamma_l \leq 1$. The positive constant $\gamma_l'$ determines the signal level at which the saturation of facilitation begins. The gain at the initial state of the network is $$g_l^p(n,k) = 1 \tag{19}$$

Incidentally, this effect of facilitation corresponds, for example, to the heterosynaptic facilitation observed in Aplysia (Castelluci and Kandel 1976).

(4)-2 Controlling the Efficiency of the Inhibitory Input

Consider a case in which a $u_C$-cell is silent while the corresponding $w_C$-cell is activated by efferent signals. This means that the feature which the $u_C$-cell should extract has not been detected in the afferent paths. In other words, none of the $u_S$-cells presynpatic to this $u_C$-cell could extract the feature which is supposed to exist there. It is a $w_{CX}$-cell that detects the situation in which $u_S$-cells do not yield an output.

The output of a $w_{CX}$-cell is given by:

$$w'_{CX}(n,k) = \phi\left[ w'_C(n,k) - \sum_{v \in D_l} d_l(v) \cdot u'_{Sl}(n + v, k) \right] \tag{20}$$

In order to detect a condition in which a $w_C$-cell, but not a $u_C$-cell, is activated, one might think that the subtraction of the output of the $u_C$-cell from the output of the $w_C$-cell would be enough. However, this is not always the case, because the output of the $u_C$-cell might be attenuated by habituation. Hence, in the present model, instead of the output of the $u_C$-cell itself, the signal converging from presynaptic $u_S$-cells is used (FIG. 2).

To be more exact, the spreading area $D_l'$ of the afferent connection $d_l'(v)$ to a $w_{CX}$-cell from $u_S$-cells is determined as a little wider than the spreading area $D_l$ of the afferent connections $d_l(v)$ to a $u_C$-cell. This is for the following reason: let a stimulus pattern be a slightly deformed version of a learned pattern. The output of the $u_C$-cells elicited by the stimulus pattern itself might possibly arise at a slightly different position than that of the $w_C$-cells, which is determined by the response to the training pattern during the learning period. In order to prevent a spurious output from the $w_{CX}$-cells caused by a discrepancy between the output of these two groups of cells, the spreading area $D_l'$ is determined as a little larger than $D_l$ in formula (13).

Now, if a $w_{CX}$-cell is activated, it releases a kind of neuromodulator $x_s$ to corresponding $u_S$-cells. In this case, the neuromodulator is transmitted through paths inverse to the afferent connections converging to the $u_C$-cell from the $u_S$-cells. Quantitatively, the amount of neuromodulator $\chi_s$ which acts on cell $u_{Sl}(n,K)$ is $$x'_s(n,k) = \beta_l x'^{-1}_{sl}(n,k) + \beta_l' \cdot \sum_{v \in D_l} d_l(v) \cdot w^{t-1}_{CXl}(n - v, k) \tag{21}$$

or neuromodulator is gradually accumulated with the passage of time, and, at the same time, decreases with an attenuation constant $\beta_l (0 < \beta_l \leq 1)$. In the computer simulation discussed later, we put $\beta_l = 1$. $\beta_l'$ is another positive constant.

The neuromodulator $x_s$ weaken the efficiency of the inhibitory signals from the $u_{Sl}$-cell, and decreases the selectivity of feature extraction by the $u_S$-cell. Incidentally, a similar process has been hypothesized in the hierarchical associative memory model (Fukushima 1984).

Quantitatively, the efficiency of the inhibition is determined by the variable $\gamma_l$ in (9), and the value of $\gamma_l$ is controlled by the neuromodulator $x_s$ as follows.

$$\gamma_l^t(n,K) = \frac{\gamma_l^0}{1 + x'_s(n,k) + x'_{\chi l}} \tag{22}$$

where $\gamma_l^0$ is the initial value of $\gamma_l$. The variable $x_{\chi l}'$ represents the amount of another neuromodulator released by signal $x$ from the maximum-detector MD, which will be discussed later [see (25)]. In the highest stage $U_L$, no $w_{CX}$-cells exit, but formula (22) can be applied if $x_S$ is assumed to be zero.

Thus, neuromodulator from $w_{CX}$-cells makes $u_S$-cells respond even to incomplete features to which, in the normal state, no $u_S$-cell would respond. In other words, by control of the neuromodulator, $u_S$-cells search for even vague traces in defective parts of the stimulus pattern, and try to detect features which should exist there.

Once a $u_S$-cell has been thus activated, the efferent signal now comes to be further transmitted to the lower stages via the $w_S$-cell corresponding to the $u_S$-cell.

(5) Association and Segmentation (Initial Stage $U_O$)

As described above, even if a number of stimulus patterns are simultaneously presented to the network, only components of the recognized pattern, determined by the response of $u_{CL}$-cells in the highest stage, are fed back to layer $W_{CO}$ (i.e., the layer of $w_C$-cells in the initial stage). In this case, the efferent signals retrace the same route as the afferent ones. Hence, even if the stimulus pattern is a deformed version of the standard pattern which has already been learned, only the signal components corresponding to the recognized pattern appear in layer $W_{CO}$ for the identically deformed shape. Even if the stimulus pattern has some parts missing, these are interpolated smoothly, and a perfect pattern emerges in layer $W_{CO}$.

Therefore, the output of layer $W_{CO}$ can be interpreted as an auto-associative recall from the associative memory. From a different point of view, the output of layer $W_{CO}$ can also be interpreted as the result of segmentation, where only components relevant to a single pattern are selected from the stimulus. The category of the segmented pattern can be judged (or recognized) by noting which $u_{CL}$-cell is activated. Thus, we can also conclude that segmentation and pattern recognition are simultaneously performed.

In order to improve the ability to interpolate defects, the model in the present invention has such a structure that the recalled output of layer $W_{CO}$ is fed back positively to layer $U_{CO}$. That is, both the stimulus input p and the recalled output $W_{CO}$ are superposed in layer $U_{CO}$, as shown in FIG. 1. Expressed mathematically:

$$u_{CO}{}^t(n) = g_O{}^t(n) \cdot max[p^t(n), w_{CO}{}^t(n)]tm \tag{23}$$

The grain g is given by formulae (18), (19) and (26) in the same manner as for the intermediate layers. Incidentally, stage $U_O$ contains only $u_C$- and $w_C$-cells, and the output of a $w_C$-cell is also given by formula (15).

Since a positive feedback loop is included in the network, the recalled output, which is first generated only by the stimulus p, is fed back to the input, and another recalling process goes on with the newly-recalled output as a new input. Therefore, even if the interpolation cannot be completed in a single recalling process because the defects are too large, the defects will gradually be filled up during a chain of associative recall, and a perfect pattern without any defect is finally obtained.

As may be seen in formula (23), not only feedback signals form $W_{CO}$ but also the stimulus input p is still given to layer $U_{CO}$, even after the start of the chain of associative recall. This mechanism prevents unlimited drift int he recall, and suppresses the appearance of useless patterns unrelated to the stimulus.

(6) The Maximum-Detector

When two or more patterns are simultaneously presented, two or more $u_c$-cells may be activated simultaneously, even in the highest stage $U_L$. In such a case, the stimulus pattern corresponding to the $u_{CL}$-cell of maximum output is selected first, to start processing these patterns in turn. This selection of the maximum-output cell is done by the maximum-detector shown at far right in FIG. 1. The maximum-detector selects the one which is yielding the largest output from among the $u_{CL}$-cells. The pattern of the category which corresponds to the $u_{CL}$-cell thus selected can now be interpreted as recognized.

Once the maximum-output $u_{CL}$-cell has been selected in the highest stage, only the $w_{CL}$-cell which makes a pair of this $u_{CL}$-cell is activated by the excitatory signal from the maximum-detector, and the other $w_{CL}$-cells stay in a resting state. Thus, the output of a $w_c$-cell of stage $U_L$ is different from that of other stages, and is given by $$w^t_{CL}(k) = \begin{cases} 1 \text{ if } u^t_{CL}(k) = \max_\kappa [u^t_{CL}(\kappa)] > 0 \\ 0 \text{ else} \end{cases} \quad (24)$$

Therefore, in the network, only afferent paths relevant to the pattern which is now being detected (or recognized) at the highest stage are facilitated by the action of efferent signals from the activated $w_{CL}$-cell. The mechanism of this facilitation has already been discussed.

Sometimes all the $u_{CL}$-cells in the highest stage are silent. For instance, if too many patterns. are simultaneously presented, or if they are too close to one another, the signals from the different patterns hinder each other, and are unable to elicit any response from the $u_{SL}$-cells. Hence $u_{CL}$-cells which receive signals from $u_{SL}$-cells are also silent. Even when presenting a single stimulus pattern, there is also a chance that no $u_{CL}$-cell will be activated if the stimulus pattern is greatly different in shape from the original pattern, or if it has large defects or a lot of noise.

The situation in which al the $u_{CL}$-cells are silent is detected by the maximum-detector, and the maximum-detector sends out signal x through the path shown in FIG. 1. This x-signal is commonly distributed to all the feature-extracting cells $u_s$ of all stages.

The amount of neuromodulator $x_x$ released by this x-signal to a single $u_s$-cell is $$x^t_{Xl} = \begin{cases} x^t_{Xl} + \beta_{Xl} \text{ if } u^{t-1}_{CL}(\kappa) = 0 \text{ for all } \kappa \\ \beta'_{Xl} \cdot x^{t-1}_{Xl} \text{ else} \end{cases} \quad (25)$$

In other words, if all the $u_{CL}$-cells in the highest state are silent, $x_x$ accumulates by a constant amount $\beta_{Xl}$. If at least one $u_{CL}$-cells is activated, however, it decreases with an attenuation ratio $\beta_{Xl}'$.

As has already been shown in formula (22), neuromodulator $x_x$ due to signal x, together with neuromodulator $x_s$ released by the $w_{CX}$-cells, weakens the efficiency of inhibition of feature-extracting cells $u_s$, lowers the threshold, and decreases the selectivity of their response. As the result, feature-extracting cells $u_s$ respond easily, even to slightly imperfect features or to stimuli mixed with irrelevant features.

The longer the silent state of the $u_{CL}$-cells continues, the more is the accumulation of neuromodulator $x_x$ released by the maximum-detector. Hence, at least one $u_{CL}$-cell becomes activated after a certain time.

The influence of the signal x on $u_s$-cells (or the value of $\beta_{Xl}$ in formula (25)) is not identical at all stages, but is greater for $u_s$-cells in higher stages. This is useful because of the following. Let two or more patterns be simultaneously presented. In the higher stages, each $u_s$-cell has a greater chance of being presented with irrelevant features together with the feature which the cell is due to extract because it has a larger receptive field. Hence the selectivity of response should be adaptively changed to extract the relevant feature without being hindered by accompanying irrelevant features. In the lower stages, however, the control of selectivity is not so important, because each $u_s$-cell has a smaller receptive field, and has small chance of being presented with two or more features simultaneously.

Incidentally, during the period in which the x-signal is being sent from the maximum-detector, the gain g of the $u_c$-cells in the network is assumed to be unchanged and not attenuated by formula (18).

(7) Switching Attention

Suppose one of the multiply-presented stimulus patterns is being attended to end recognized. In order to switch attention to another pattern, a momentary interruption of the efferent signal-flow is enough. Each $u_c$-cell, after the disappearance of the facilitating signal from the corresponding $w_c$-cell, will have its gain lowered if this has so far been kept high by the facilitating signal. A decrease in gain occurs like fatigue, depending on the degree of the forced increase of gain until then. On the other hand, the $u_c$-cell will recover its gain, if this has so far been attenuated by "habituation".

Quantitatively, the gain just after an interruption in the efferent signal-flow is given, not by formula (18), but by $$g^t_l(n,k) = \frac{1}{1 + \gamma_l' g^{t-1}_l(n,k)} \quad (26)$$

where $\gamma_l'$ is a positive constant.

In the highest stage $U_L$, the gain of the $U_{CL}$-cells is usually kept at 1 (i.e., $\gamma_L = 1$ in (18)). Just after the interruption of the efferent signal flow, however, the gin $g_L$ of the $u_{CL}$-cell corresponding to the $w_{CL}$-cell which has been activated until the attention shift, is made zero to prohibit a second selection of the same cell.

Incidentally, the amount of neuromodulator $x_s$ and $x_x$ is also assumed to be reset at zero just after the interruption of the efferent signal flow.

Since the gain of the $u_c$-cells are thus controlled after the interruption of the efferent signal flow, the signal components of the pattern which has so far been recognized finds it hard to flow through the afferent paths, and another pattern, different from the first one, will usually be recognized.

Therefore the process of pattern-recognition, segmentation and associative recall goes on for the multiply presented patterns in turn.

(8) Computer Simulation

We will now study the behavior of the model in the present invention by computer simulation. The scale of the simulated network is $L=3$.

We will discuss mainly the response of the network which has already finished learning, but we shall also briefly describe the earlier process of learning. During the learning period, five training patterns, "0", "1", "2", "3", and "4" shown in FIG. 15, were repeatedly presented as a stimulus input p, and the self-organization of the network occurred in a similar manner as for the neocognitron. In the initial state before learning, all the modifiable synapses of the network were assumed to have a strength of zero. During the learning period, to simplify the simulation all efferent signal-flow was stopped, and habituation of the $u_c$-cells was assumed not to occur. It is further assumed in the simulation that all the modifiable synapses lose their "plasticity" after finishing learning.

FIGS. 16-18 show the behavior of the network which has already finished learning. In these figures, the response of the cells in layers $U_{co}$ and $W_{co}$ of the initial stage is shown in time sequence. The intensity of response of the cells, which are arranged in a two-dimensional array, is shown by the density of the photographs. The patterns in the upper line show the response of layer $U_{co}$, and the patterns in the lower line show the response of layer $W_{co}$. The numeral to the upper left of each pattern represents time t after the start of stimulus presentation. The mark ▼ to the right of the numeral denotes that the efferent signal-flow has been momentarily interrupted just before this moment to switch attention. The stimulus pattern given to this network is identical to the response of layer $U_{co}$ at $t=0$, which is shown in the upper left of each figure. (It should be noted that the input pattern p appears directly in layer $U_{co}$ at $t-0$, because no response is elimited from layer $W_{co}$ for $t<0$.)

FIG. 16 is the response to stimulus "20" shown in the upper left. In layer $U_{CL}$ at the highest stage of the network, which is not shown in this figure, the gnostic cells corresponding to pattern "2" and "0" are both activated at $t=0$, but a larger response is elicited form the cell corresponding to "0". Hence, in layer $W_{CL}$, only the cell corresponding to "0" is activated by the signal from the maximum-detector MD. This signal x is fed back further to layer $W_{co}$ through the efferent paths. With a lapse of time, habituation of the $u_c$-cells builds up gradually in each layer. At $t=3$, the components of pattern "2", which is not being attended to, have already become quite weak.

At this time, in order to switch attention, the efferent signal-flow is interrupted for a moment, and the habituation of the cells recovered. The new response thus elicited is shown at $t=4$. In layer $U_{CL}$, only the gnostic cell for pattern "2" is now activated, because the gains of the $u_c$-cells which have so far been responding strongly to pattern "0" are now attenuated by fatigue. Hence, also in layer $W_{co}$ in the initial stage, only the pattern components of "2" appears.

Although patterns "0" and "2" contained in the stimulus are a little different in shape from the training patterns (FIG. 15), the patterns fed back to layer $W_{co}$ are identical in shape with the stimulus patterns now presented.

FIG. 17 shows the response to a greatly deformed pattern which even has one part missing. Since the difference between the stimulus and the training pattern is too large, no response is elicited from layer $u_{CL}$ (not shown in FIG. 17), and accordingly, to feedback signal appears at layer $W_{co}$ at $t=0$. This situation is detected by the maximum-detector, and signal x is sent. At this $t=1$, the gnostic cell for "2" becomes activated in the highest stage, because the threshold of the $u_s$-cells in the network is decreased by the x-signal. In the pattern which is now fed back to layer $W_{co}$, both ends of the missing part are already beginning to be interpolated. Partly interpolated, this signal, namely the output of layer $W_{co}$, is given to layer $U_{co}$ again, together with the stimulus p. The interpolation continues gradually while the signal is circulating in the feedback loop, and finally the missing part of the stimulus is completely filled in. As may be seen in FIG. 17, the missing part is interpolated quite naturally, even though the difference in shape between the stimulus and the training pattern is considerable. Incidentally, in the pattern for which interpolation is already finished, the horizontal bar at the bottom of the "2" is shorter than in the training pattern. But, however, short the horizontal bar is, the pattern is still a perfect character "2". Hence, this component of the pattern is left intact and is reproduced like the stimulus pattern. Thus, the deformation of the stimulus pattern is tolerated as it is, and only indispensable missing parts are naturally interpolated without any strain.

FIG. 18 shows an example of the response to a stimulus consisting of superposed patterns. As may be seen in the figure, the pattern "4" is isolated first, the pattern "2" next, and finally pattern "1" is extracted.

(9) Effect of Invention

The neural network model proposed in this invention has the ability of selectiv attention, pattern recognition and associative recall. When a composite stimulus consisting of two patterns or more is presented, the model in the present invention pays selective attention to each of the patterns one after the other, segments it from the rest, and regognizes it separately. From the engineering point of view, this invention could be effectively used as a design principle for a pattern recognizer with the function of segmentation. If we want to extend the model, and to make a system which can read a document including many different letters, it would be necessary to add more functions. For instance, it would be useful to install a mechanism like eye-movement by which the document is scanned by a small gazing-area covering only a few letters. In order to read a document written from left to right in order, the network would further need an external signal by which the signal paths from the upper left part of the gazing-area were more facilitated than that from the lower right.

The model in the present invention can also be considered as a model of associative memory. In contrast to earlier models, our model has the ability for perfect associative recall, even for deformed patterns, without being affected by their position. Hence, this invention can also be used effectively to repair imperfect patterns or to search for pictorial data from a large data-base.

In this application, the macroscopic behavior of our model has been mainly discussed, and it has been shown to resemble that of the brain in many ways. Let us consider the characteristics of the receptive field of cells of the network. The cells in the afferent paths, especially in higher stages, have a large receptive field. If two stimuli are presented to the receptive field of a cell, only a stimulus which is being attended to elicit a large response, and the response to a stimulus which is not being attended to become greatly reduced.

What is claimed is:

1. A hierarchial information processing system for processing information in parallel over a plurality of cell layers comprising:
   a plurality of afferent signal paths extending from lower order cell-layers to higher order cell-layers for processing information signals, wherein said afferent signals are processed by a plurality of feature-extracting cells $u_s$ and feature-integrating cells $u_c$ alternatively and convergingly;
   a plurality of efferent information paths extending from higher order cell-layers to lower order cell-layers for transmitting an efferent signal, wherein said efferent signals are processed by a plurality of integrative feature-indicating cells $w_c$ and feature-indicating cell $w_s$ alternatively and divergingly;
   cell layers in each stage, except input-cell layer $U_o$ of the lowest stage and the cell layer in the highest stage, having converging afferent connections from feature-extracting cells $u_s$ to feature-integrating cells $u_c$, and diverging efferent connections from an integrative feature-indicating cell $w_c$ to feature-indicating cell $w_s$;
   a threshold controlling cell $w_{cx}$ for receiving signals from the cell $w_c$ via unmodifiable excitatory connections and receiving converging signals form the cells $u_s$ in the same stage and controlling the selectivity for extracting particular features by said feature-extracting cells $u_s$;
   wherein each feature-extracting cell $u_s$ is connected to send an unmodifiable excitatory signal or gate signal to each feature-indicating cell $w_s$, and each integrative feature-indicating cell $w_c$ is connected to send a gain control or heterosynaptic facilitation signal to a feature-integrating cell $u_c$, and the transmission of efferent signals is gated by the afferent signals in the cell $w_s$, and simultaneously, the transmission of afferent signals is facilitated by the presence of the efferent signals in the cell $w_c$;
   whereby a pattern corresponding to the cell which is yielding the largest output among the feature-integrating cells $u_c$ of the highest stage is interpreted as recognized; and the output of the cell layer $w_{co}$ of integrative feature-indicating cells of the lowest stage being interpreted as the output of associative recall or as the result of segmentation of a signal pattern which is now being recognized.

2. A hierarchical information processing system for processing information in parallel over a plurality of cell layers as defined in claim 1, further comprising feedback means for transmitting a signal x derived from a maximum detector when the maximum output is zero to all feature-extracting cells $u_s$ so as to lessen the inhibition to each target cell $u_s$.

3. A hierarchical information processing system for processing information in parallel over a plurality of cell layers as defined in claim 1, further comprising an inhibiting cell $u_{sv}$ convergingly receiving a pattern signal from the said feature-integrating cell $u_c$ of the preceding stage and sending output signals via modifiable inhibitory connections to the said feature-extracting cell $u_s$.

4. A hierarchical information processing system for processing information in parallel over a plurality of cell layers as defined in claim 1, further comprising a feature-indicating inhibitory cell $w_{sv}$ connected to the feature-indicating cell $w_s$ and connected divergingly and unmodifiably to the integrative feature-indicating cell $w_c$ in the lower stage.

5. A hierarchical information processing system for processing information in parallel over a plurality of cell layers as defined in claim 1, wherein the afferent signal path of serial connection of the feature-integrating cell $u_c$ and the feature-extracting cell $u_s$ and the efferent signal path of serial connection of the integrative feature-indicating cell $w_c$ and the feature-indicating cell $w_s$ are interconnected so as to affect said efferent signal by gain control signal from $w_c$ cell and to affect efferent signal by gate signal from $u_s$ cell to $w_s$ cell; and the feature-extracting cell $u_s$ is affected by feedback signal x from a maximum detector in the highest stage, and the integrative feature-indicating cell $w_c$ is affected by an unmodifiable inhibitory signal from the feature-indicating inhibitory cell $w_{sv}$ activated by feature-indicating cell $w_s$.

6. A hierarchical information processing system for processing information in parallel over a plurality of cell layers comprising:
   a plurality of afferent signal paths extending from lower order cell-layers to higher order cell-layers for processing information signals, wherein said afferent signals are processed by a plurality of feature-extracting cells $u_s$ and feature-integrating cells $u_c$ alternatively and convergingly;
   a plurality of efferent information paths extending from higher order cell-layers to lower order cell-layers for transmitting an efferent signal, wherein said efferent signals are processed by a plurality of integrative feature-indicating cells $w_c$ and feature-indicating cells $w_s$ alternatively and divergingly;
   cells layers in each stage, except input-cell layer $U_o$ of the lowest stage and the cell layer in the highest stage, having converging afferent connections from feature-extracting cells $u_s$ to feature-integrating cells $u_c$, and diverging efferent connections from an integrative feature-indicating cell $w_c$ to a feature-indicating cell $w_s$;
   an inhibiting cell $u_{sv}$ convergingly receiving a pattern signal from the said feature-integrating cell $u_c$ of the preceding stage and sending output signals via modifiable inhibitory connections to the said feature-extracting cell $u_s$;
   a threshold controlling cell $w_{cx}$ receiving signals from the cell $w_c$ via unmodifiable excitatory connections and receiving converging signals from the cells $u_s$ in the same stage and controlling the selectivity for extracting particular features by said feature-extracting cell $u_s$;
   a feature-indicating inhibitory cell $w_{sv}$ connected to the feature-indicating cell $w_s$ and connected divergingly and unmodifiably to the integrated feature-indicating cell $w_c$ in the lower stage;

wherein each feature-extracting cell $u_s$ is connected to send an unmodifiable excitatory signal or gate signal to each feature-indicating sell $w_s$, and each integrative feature-indicating cell $w_c$ is connected to send a gain control or heterosynaptic facilitation signal to a feature-integrating cell $u_c$, and the transmission of efferent signals is gated by the afferent signals in the cell $w_s$, and simultaneously, the transmission of afferent signals is facilitated by the presence of the efferent signals in the cell $w_c$;

whereby a pattern corresponding to the cell which is yielding the largest output among the feature-integration cells $u_c$ of the highest stage is interpreted as recognized; and the output of the cell layer $w_{co}$ of integrative feature-indicating cells of the lowest stage being interpreted as the output of associative recall or as the result of segmentation of a single pattern which is now being recognized.

7. A hierarchical information processing system as defined in claim 6, further comprising feedback means for transmitting a signal x derived from a maximum detector when the maximum output is zero to all feature-extracting cells $u_s$ so as to lessen the inhibition to each target cell $u_s$.

8. A hierarchial information processing system for processing information in parallel over a plurality of cell layers comprising:

a plurality of afferent signal paths extending from lower order cell-layers to higher order cell-layers for processing information signals, wherein said afferent signals are processed by a plurality of feature-extracting analog cells $u_s$ and feature-integrating analog cells $u_c$ alternatively and convergingly;

a plurality of efferent information paths extending from higher order cell-layers to lower order cell-layers for transmitting an efferent signal, wherein said efferent signals are processed by a plurality of integrative feature-indicating analog cells $w_c$ and feature-indicating analog cell $w_s$ alternatively and divergingly;

cell layers in each stage, except input-cell layer $U_o$ of the lowest stage and the cell layer in the highest stage, having converging afferent connections from feature-extracting cells $u_s$ to feature-integrating cells $u_c$, and diverging efferent connections from an integrative feature-indicating cell $w_c$ to feature-indicating cell $w_s$;

wherein each feature-extracting cell $u_s$ is connected to send an unmodifiable excitatory signal or gate signal to each feature-indicating cell $w_s$, and each integrative feature-indicating cell $w_c$ is connected to send a gain control or heterosynaptic facilitation signal to a feature-integrating cell $u_c$, and the transmission of efferent signals is gated by the afferent signals in the cell $w_s$, and simultaneously, the transmission of afferent signals is facilitated by the presence of the efferent signals in the cell $w_c$;

whereby a pattern corresponding to the cell which is yielding the largest output among the feature-integrating cells $u_c$ of the highest stage is interpreted as recognized; and the output of the cell layer $w_{co}$ of integrative feature-indicating cells of the lowest stage being interpreted as the output of associative recall or as the result of segmentation of a single pattern which is now being recognized.

* * * * *

UNITED STATES PATENT AND TRADEMARK OFFICE
CERTIFICATE OF CORRECTION

PATENT NO. : 5,058,184

DATED : October 15, 1991

INVENTOR(S) : Kunihiko FUKUSHIMA

It is certified that error appears in the above-identified patent and that said Letters Patent is hereby corrected as shown below: Title page:

Item (54):

Change "HIERACHICAL" to --HIERARCHICAL--.

Signed and Sealed this

Twelfth Day of January, 1993

*Attest:*

DOUGLAS B. COMER

*Attesting Officer*     *Acting Commissioner of Patents and Trademarks*